US009332417B2

(12) United States Patent
Zhang et al.

(10) Patent No.: US 9,332,417 B2
(45) Date of Patent: May 3, 2016

(54) APPARATUSES AND METHODS FOR COORDINATING OPERATIONS OF MULTIPLE WIRELESS COMMUNICATIONS MODULES WITH MULTIPLE SUBSCRIBER NUMBERS

(75) Inventors: Ker Zhang, San Diego, CA (US); Hong-Kui Yang, San Diego, CA (US); Sheng-Hung Wang, San Diego, CA (US); Huai-Wen Su, Beijing (CN); Jian Gu, Beijing (CN); Amelia Hungmei I, Mountain View, CA (US); Chia-Hsun Liu, Taipei (TW)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 13/075,045

(22) Filed: Mar. 29, 2011

(65) Prior Publication Data

US 2011/0235587 A1    Sep. 29, 2011

(30) Foreign Application Priority Data

Mar. 29, 2010  (CN) .......................... 2010 1 0144086

(51) Int. Cl.
*H04W 84/00* (2009.01)
*H04W 8/18* (2009.01)
*H04M 1/725* (2006.01)
*H04W 48/18* (2009.01)
*H04W 88/06* (2009.01)

(52) U.S. Cl.
CPC .......... *H04W 8/183* (2013.01); *H04M 1/72519* (2013.01); *H04M 2250/66* (2013.01); *H04W 48/18* (2013.01); *H04W 88/06* (2013.01)

(58) Field of Classification Search
USPC .................................................. 370/328, 342
See application file for complete search history.

(56) References Cited

U.S. PATENT DOCUMENTS

| 8,290,518 | B2 * | 10/2012 | Fang et al. | 455/458 |
|---|---|---|---|---|
| 2003/0112785 | A1 * | 6/2003 | Jain et al. | 370/342 |
| 2006/0234693 | A1 * | 10/2006 | Isidore et al. | 455/422.1 |
| 2008/0300008 | A1 * | 12/2008 | Kim | 455/552.1 |
| 2009/0131054 | A1 * | 5/2009 | Zhang | 455/436 |
| 2011/0194530 | A1 * | 8/2011 | Tinnakornsrisuphap et al. | 370/331 |

FOREIGN PATENT DOCUMENTS

| CN | 201032743 | 3/2008 |
|---|---|---|
| CN | 201360354 | 12/2009 |

OTHER PUBLICATIONS

English language translation of abstract of CN 201032743 (published Mar. 5, 2008).
English language translation of abstract of CN 201360354 (published Dec. 9, 2009).

* cited by examiner

*Primary Examiner* — Dang Ton
*Assistant Examiner* — Pamit Kaur
(74) *Attorney, Agent, or Firm* — Schiff Hardin LLP

(57) ABSTRACT

A wireless communications device is provided with a plurality of card slots, a first wireless communications module, and a second wireless communications module. The card slots are inserted with at least one subscriber identity card. The first wireless communications module performs wireless transceiving in compliance with at least a first wireless technology. The second wireless communications module determines at least a first subscriber number and a second subscriber number from the at least one subscriber identity card, and enables the wireless transceiving of the first wireless communications module using the first subscriber number. Also, the second wireless communications module performs wireless transceiving in compliance with at least a second wireless technology using the second subscriber number.

18 Claims, 14 Drawing Sheets

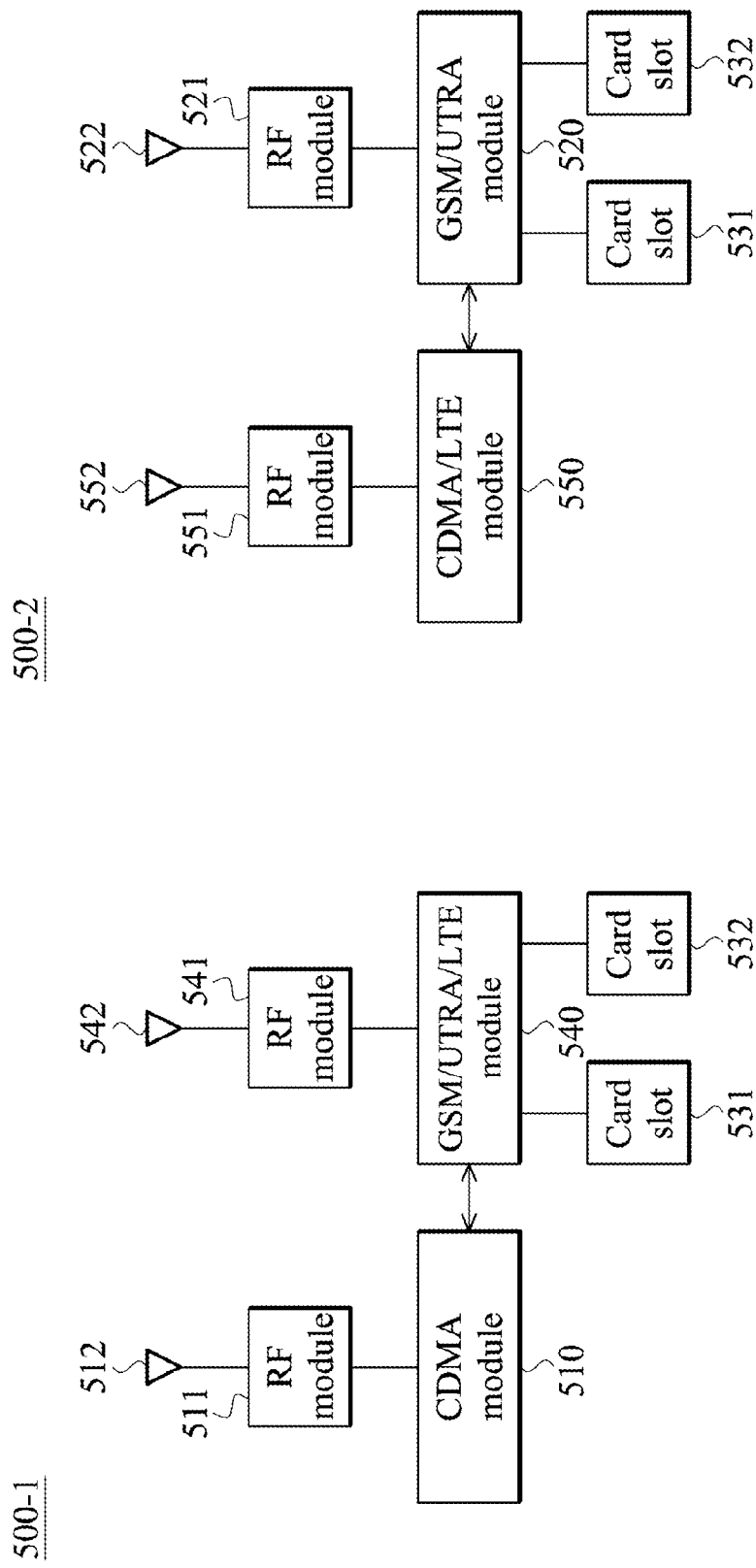

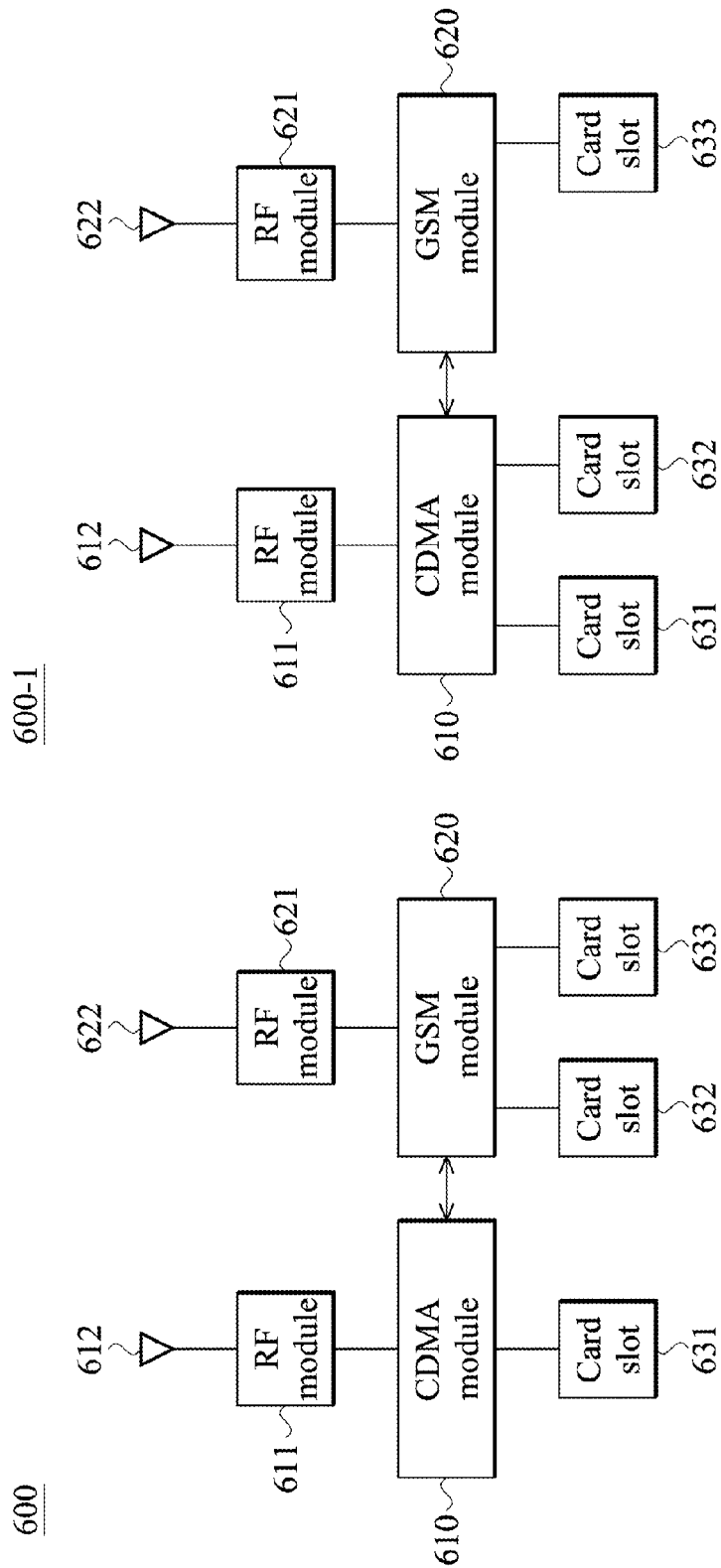

APPARATUSES AND METHODS FOR COORDINATING OPERATIONS OF MULTIPLE WIRELESS COMMUNICATIONS MODULES WITH MULTIPLE SUBSCRIBER NUMBERS

CROSS REFERENCE TO RELATED APPLICATIONS

This Application claims priority of China Patent Application No. 201010144086.7, filed on Mar. 29, 2010, the entirety of which is incorporated by reference herein.

BACKGROUND OF THE INVENTION

1. Field of the Invention

The invention generally relates to the coordination of operations of multiple wireless communications modules, and more particularly, to the coordination of multiple co-located wireless communications modules to support multiple-standby operations using one or more subscriber identity cards.

2. Description of the Related Art

With growing demand for ubiquitous computing and networking, various wireless communication technologies have been developed, such as the Global System for Mobile communications (GSM) technology, General Packet Radio Service (GPRS) technology, Enhanced Data rates for Global Evolution (EDGE) technology, Universal Mobile Telecommunications System (UMTS) Terrestrial Radio Access (UTRA) technology, High Speed xlink Packet Access (HSxPA) technology, Long Term Evolution (LTE) technology, LTE-Advanced technology, Time Division-Synchronous Code Division Multiple Access (TD-SCDMA) technology, Time-Division LTE (TD-LTE) technology, TD-LTE-Advanced technology, Interim Standard 95 (IS-95) technology, Code Division Multiple Access 2000 (CDMA2000) technology, CDMA 2000 1x Evolution-Data Optimized or Evolution-Data (CDMA2000 1x EV-DO) technology, Worldwide Interoperability for Microwave Access (WiMAX) technology, and others. Generally, a cellular phone only supports one wireless communication technology and provides a user with the flexibility of mobile communications at all times via the supported wireless communication technology, regardless of his/her geographic location. Especially in today's business world, a cellular phone is becoming a necessary business tool for conveniently conducting business. For business people, having an additional cellular phone exclusively for business matters is a common choice, since they need to conduct business while out of the office or even out of the city/country. Others may find that having an additional cellular phone is a good way to save/control the budget for wireless service charges (including phone services and/or data services). However, having two or more than two cellular phones may be troublesome when one has to switch frequently between the cellular phones and carry around all the cellular phones with himself/herself. In order to provide a convenient way of having multiple subscriber numbers, dual-mode cellular phones have been developed, which generally have two wireless communications modules for respectively performing wireless transmission and reception with an individual subscriber number. The dual-mode design allows both wireless communications modules to be active simultaneously and allows calls to be received on either subscriber numbers associated with one of the wireless communications modules at any time. Thus, a dual-mode cellular phone may be used for business and personal use with separate subscriber numbers and bills, or for travel with the second subscriber number for the country visited.

Generally, a dual-mode cellular phone has 1 to 2 card slots in which subscriber identity cards are inserted. Taking a dual-mode cellular phone supporting the CDMA and GSM technologies and having 2 card slots as an example, one card slot is reserved for inserting a Removable User Identity Module (R-UIM) card which stores information concerning subscriber identity, subscriber number, and phone book, etc., for the CDMA technology, and the other card slot is reserved for inserting a Subscriber Identity Module (SIM) card which stores information concerning subscriber identity, subscriber number, and phone book, etc., for the GSM technology. The dual-mode dual-slot cellular phone may provide that both the CDMA and GSM technologies to operate in the standby mode. Since the design of the card slots is accorded with the supported wireless technologies (i.e. one card slot for the CDMA technology, and the other card slot for the GSM technology), inconveniences may arise when the user wishes to use the wireless services of the CDMA technology or the GSM technology using 2 R-UIM cards or 2 SIM cards, and when the user mistakenly inserts a SIM card in the card slot for the CDMA technology or a R-UIM card in the card slot for the GSM technology. Especially in the latter situation, inserting the wrong type of subscriber identity cards may cause the dual-mode cellular phone to not be able to launch wireless functions normally and further hinder user experience.

On the other hand, for a dual-mode single-slot cellular phone, it may be provided with only one of the CDMA and GSM technologies operating in the standby mode, or it may be provided with both the CDMA and GSM technologies operating in the standby mode but under a condition that the card slot is usually reserved for only inserting a SIM card. In the former situation, having only one of the CDMA and GSM technologies operating in the standby mode is inconvenient as the user is required to manually switch the active wireless services between the CDMA and GSM technologies. In the latter situation, reserving only one type of subscriber identity card for insertion limits the cellular phone to store only the phone book, short messages, and other information for the GSM technology in the local storage module.

Therefore, it is desirable to have a flexible way of coordinating the operations of multiple wireless communications modules in a wireless communications device having multiple card slots, so that multiple standby operations of the multiple wireless communications modules may be provided.

BRIEF SUMMARY OF THE INVENTION

Accordingly, embodiments of the invention provide apparatuses and methods for coordinating the operations of multiple wireless communications modules with multiple subscriber numbers. In one aspect of the invention, a wireless communications device with a plurality of card slots, a first wireless communications module, and a second wireless communications module is provided. The card slots are inserted with at least one subscriber identity card. The first wireless communications module performs wireless transceiving in compliance with at least a first wireless technology. The second wireless communications module determines at least a first subscriber number and a second subscriber number from the at least one subscriber identity card, and enables the wireless transceiving of the first wireless communications module using the first subscriber number. Also, the second wireless communications module performs wireless transceiving in compliance with at least a second wireless technology using the second subscriber number.

In another aspect of the invention, a wireless communications device with a plurality of card slots, a first wireless communications module, a second wireless communications module, and an application processor is provided. The card slots are inserted with at least one subscriber identity card. The first wireless communications module and the second wireless communications module perform wireless transceiving in compliance with at least a first wireless technology and at least a second wireless technology, respectively. The application processor determines at least a first subscriber number and a second subscriber number from the at least one subscriber identity card, and enables the wireless transceiving of the first wireless communications module and the second wireless communications module using the first subscriber number and the second subscriber number, respectively.

In another aspect of the invention, a method for coordinating operations of multiple wireless communications modules in a wireless communications device with multiple subscriber numbers is provided. The method comprises the steps of providing a first wireless communications module and a second wireless communications module in compliance with at least a first wireless technology and at least a second wireless technology, respectively, detecting at least one subscriber identity card inserted into a plurality of card slots, determining at least a first subscriber number and a second subscriber number from the at least one subscriber identity card, and enabling the first wireless communications module and the second wireless communications module for wireless transceiving using the first subscriber number and the second subscriber number, respectively.

Other aspects and features of the present invention will become apparent to those with ordinarily skill in the art upon review of the following descriptions of specific embodiments of the apparatuses and methods for coordinating the operations of multiple wireless communications modules with multiple subscriber numbers.

BRIEF DESCRIPTION OF DRAWINGS

The invention can be more fully understood by reading the subsequent detailed description and examples with references made to the accompanying drawings, wherein:

FIGS. 5B and 5C are block diagrams illustrating alternatives for the architecture of the MS in FIG. 5A;

FIG. 6A is a block diagram illustrating the architecture of an MS with three card slots according to an embodiment of the invention;

FIG. 6B is a block diagram illustrating an alternative for the architecture of the MS in FIG. 6A;

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 1:
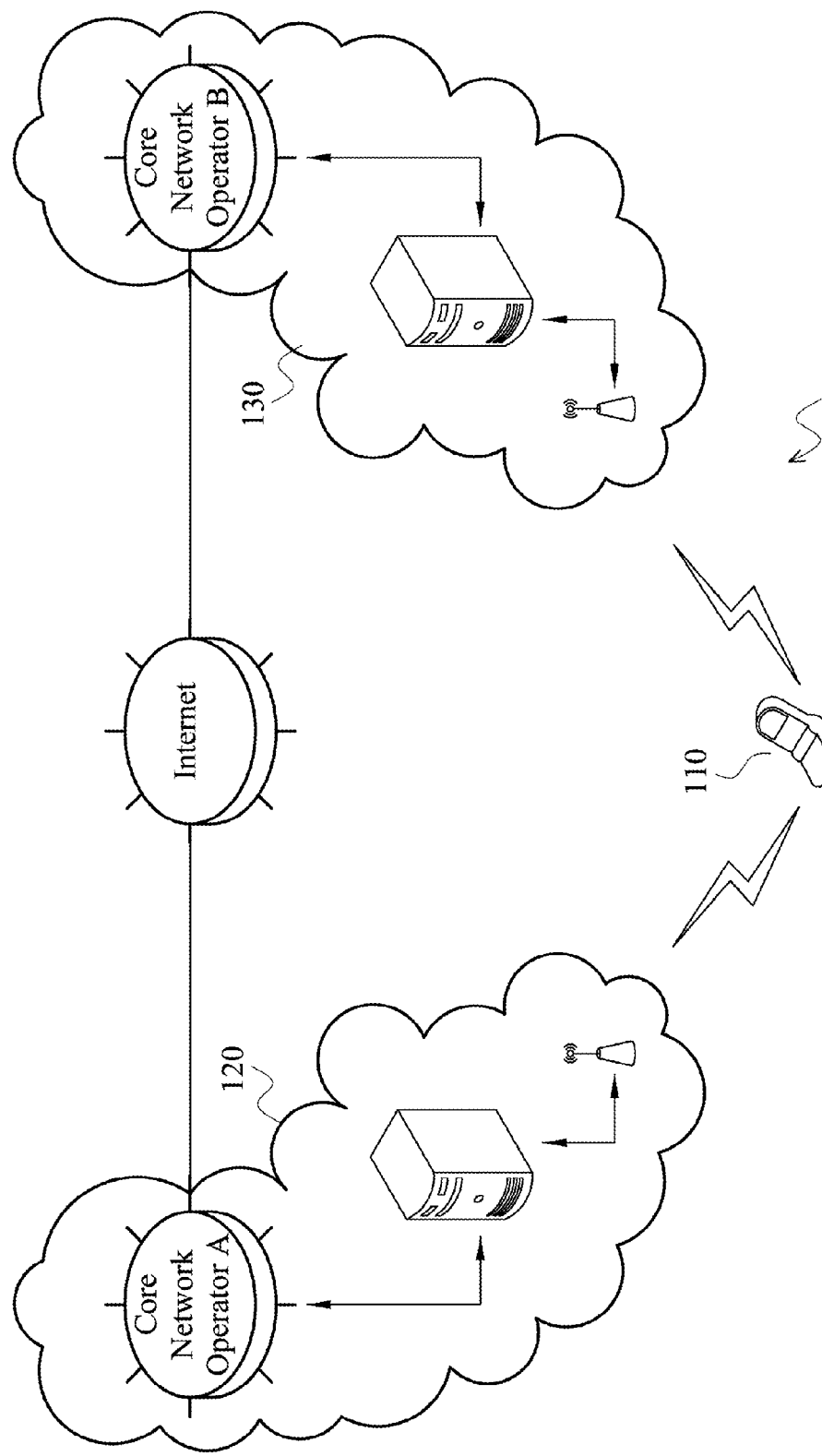
FIG. 1 is a block diagram of a wireless communications environment according to an embodiment of the invention.

FIG. 1 is a block diagram of a wireless communications environment according to an embodiment of the invention. The wireless communications environment 100 comprises a mobile station (MS) 110, and service networks 120 and 130. The MS 110 may wirelessly communicate with the service networks 120 and 130 with two separate subscriber numbers, after camping on two cells. The cell may be managed by a node-B, a base station (BS), an advanced BS (ABS), an enhanced BS (EBS), or others. The service networks 120 and 130 may be in compliance with any two of the GSM, GPRS, EDGE, UTRA, HSxPA, LTE, LTE-Advanced, TD-SCDMA, TD-LTE, TD-LTE-Advanced, IS-95, CDMA2000 1x, CDMA2000 1x EV-DO, and WiMAX, technologies. The subscriber numbers may be provided by two separate subscriber identity cards in compliance with the specifications of the technologies employed by the service networks 120 and 130. For example, the service network 120 may be a GSM, GPRS, or EDGE system and correspondingly, one of the subscriber identity cards may be a Subscriber Identity Module (SIM) card, while the service network 130 may be a CDMA2000 1x or CDMA2000 1x EV-DO system and correspondingly, the other one of the subscriber identity cards may be an R-UIM card. Alternatively, the service network 130 may be a UTRA, LTE, LTE-Advanced, TD-LTE, or TD-LTE-Advanced system and correspondingly, the other one of the subscriber identity cards may be a Universal SIM (USIM) card. Moreover, the service network 130 may be a TD-SCDMA system and correspondingly, the other one of the subscriber identity cards may be a CDMA subscriber Identity Module (CSIM) card.

Figure 2:
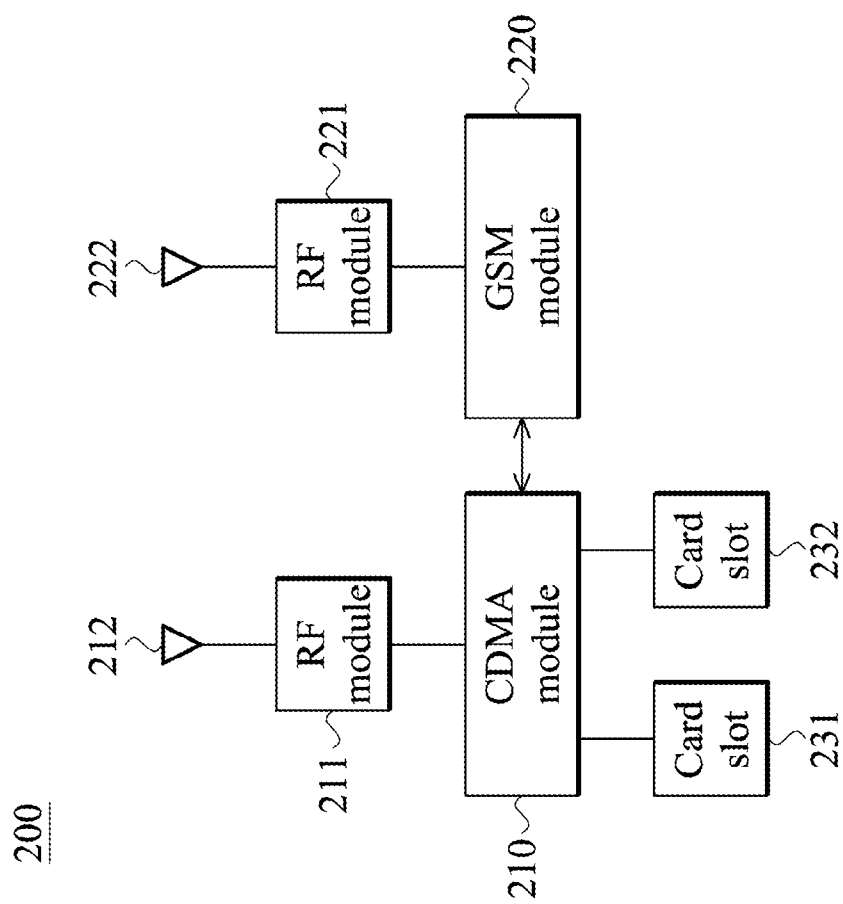
FIG. 2 is a block diagram illustrating the architecture of an MS with two card slots according to an embodiment of the invention.

The MS 110 wirelessly accesses Internet resources, such as an e-mail transmission, Web browsing, file uploading/downloading, instant messaging, streaming videos, voice over IPs (VOIP) or others, or makes a wireless phone call. In addition, a computer host or a notebook may connect/couple to the MS 110 and wirelessly access Internet resources therethrough. FIG. 2 is a block diagram illustrating the architecture of an MS with two card slots according to an embodiment of the invention. The MS 200 comprises a CDMA module 210, a GSM module 220, and two card slots 231 and 232 coupled to the CDMA module 210. The CDMA module 210 may provide the functionality of wireless transceiving in compliance with any combination of the IS-95, CDMA2000 1x, and CDMA2000 1x EV-DO technologies, while the GSM module 220 may provide the functionality of wireless transceiving in compliance with any combination of the GSM, GPRS, and EDGE technologies. Particularly, the CDMA module 210 and the GSM module 220 are coupled with the RF modules 211 and 221, respectively, wherein the RF modules 211 and 221 are further coupled with the antenna 212 and 222, respectively. In other embodiments, the CDMA module 210 may be further coupled to one or more extra sets of an RF module and an antenna (not shown) for increasing the data rate of the wireless transceiving from and to the CDMA module 210, and the invention is not limited thereto. Each of the CDMA module 210 and the GSM module 220 may contain multiple hardware devices to perform baseband signal processing, including analog to digital conversion (ADC)/digital to analog conversion (DAC), gain adjusting, modulation/demodulation, encoding/decoding, and so on. The RF modules 211 and 221 may receive RF wireless signals from the antennae 212 and 222, respectively, and convert the received RF wireless signals to baseband signals, which are then processed by the CDMA module 210 and the GSM module 220. Also, the RF modules 211 and 221 may receive baseband signals from the CDMA module 210 and the GSM module 220, respectively, and convert the received baseband signals to RF wireless signals, which are later transmitted via the antennae 212 and 222. Each of the RF modules 212 and 222 may also contain multiple hardware devices to perform radio frequency conversion. For example, each of the RF modules 212 and 222 may comprise a mixer to multiply the baseband signals with a carrier oscillated in the radio frequency of the wireless communications system, wherein the radio frequency may be 900 MHz, 1800 MHz or 1900 MHz utilized in GSM systems, or may be 900 MHz, 1900 MHz or 2100 MHz utilized in UTRA systems, or others depending on the radio access technology (RAT) in use. In this embodiment, since there are two card slots 231 and 232 in the MS 200, one or two subscriber identity cards may be inserted in the card slots 231 and 232 for providing subscriber information, such as the information concerning subscriber numbers, phone book contacts, and Short Message Service (SMS) messages, etc., for the CDMA module 210 and the GSM module 220.

Note that both the card slots 231 and 232 are coupled to the CDMA module 210, so that the CDMA module 210 and the GSM module 220 are configured as a master and a slave, respectively. That is, the CDMA module 210 is responsible for detecting the number and type of subscriber identity cards inserted in the card slots 231 and 232, and for activating the GSM module 220 to enter the standby mode in which the functionality of wireless transceiving is enabled, if one of the detected subscriber identity cards contains a subscriber number for the GSM module 220. As a slave, the GSM module 220 may be initially configured to be off, and later switched to be on to enter the standby mode when activated by the CDMA module 210. As a master, the CDMA module 210 determines the working mode of the MS 200 according to the number and type of the detected subscriber identity cards. For example, if only one single-mode subscriber identity card is detected to be a SIM card or an R-UIM card, the working mode of the MS 200 is determined to be a single communication mode in which the functionality of wireless transceiving of the CDMA module 210 is enabled with the R-UIM card or the functionality of wireless transceiving of the GSM module 220 is enabled with the SIM card. If two single-mode subscriber identity cards are detected to be a SIM card and an R-UIM card, or if only one dual-mode subscriber identity card supporting both the GSM/GPRS/EDGE and the IS-95/CDMA2000 1x/CDMA2000 1x EV-DO technologies is detected, the working mode of the MS 200 is determined to be a double communication mode in which the functionalities of wireless transceiving of the CDMA module 210 and the GSM module 220 are enabled with the R-UIM card and the SIM card, respectively or enabled with two separate subscriber numbers read from the dual-mode subscriber identity card. If two single-mode subscriber identity cards are detected to be two SIM cards or two R-UIM cards, the working mode of the MS 200 is determined to be a double communication mode in which the functionality of wireless transceiving of the CDMA module 210 is enabled with the two R-UIM cards separately or the functionality of wireless transceiving of the GSM module 220 is enabled with the two SIM cards separately. If one single-mode subscriber identity card is detected to be a SIM card and one dual-mode subscriber identity card supporting both the GSM/GPRS/EDGE and the IS-95/CDMA2000 1x/CDMA2000 1x EV-DO technologies is detected, the working mode of the MS 200 is determined to be a triple communication mode in which the functionality of wireless transceiving of the CDMA module 210 is enabled with one subscriber number read from the dual-mode subscriber identity card and the functionality of wireless transceiving of the GSM module 220 is enabled with the SIM card and the other subscriber number read from the dual-mode subscriber identity card. If one single-mode subscriber identity card is detected to be an R-UIM card and one dual-mode subscriber identity card supporting both the GSM/GPRS/EDGE and the IS-95/CDMA2000 1x/CDMA2000 1x EV-DO technologies is detected, the working mode of the MS 200 is determined to be a triple communication mode in which the functionality of wireless transceiving of the CDMA module 210 is enabled with the R-UIM card and one subscriber number read from the dual-mode subscriber identity card and the functionality of wireless transceiving of the GSM module 220 is enabled with the other subscriber number read from the dual-mode subscriber identity card. If two dual-mode subscriber identity cards supporting both the GSM/GPRS/EDGE and the IS-95/CDMA2000 1x/CDMA2000 1x EV-DO technologies are detected, the working mode of the MS 200 is determined to be a quadruple communication mode in which the functionality of wireless transceiving of the CDMA module 210 is enabled with two subscriber numbers read from the dual-mode subscriber identity cards, respectively, and the functionality of wireless transceiving of the GSM module 220 is enabled with the other two subscriber numbers read from the dual-mode subscriber identity cards, respectively. To further clarify, in order to enable the functionality of wireless transceiving of the CDMA module 210 or the GSM module 220, the CDMA module 210 reads the subscriber information stored in the detected subscriber identity card(s), and further transfers the subscriber information concerning the GSM module 220 to the GSM module 220 if one of the detected subscriber identity cards contains a subscriber number for the GSM module 220. In addition, the CDMA module 210 may receive subscriber information concerning the GSM module 220 from the GSM module 220 and store the received subscriber information to the SIM card(s) or the dual-mode subscriber identity card(s). In another embodiment, the working mode of the MS 200 may be determined according to the previously stored working mode, or the user may manually input his/her selection for the working mode of the MS 200. Alternatively, the working mode of the MS 200 may be determined according to any combination of the number and type of the detected subscriber identity cards, the previously stored working mode, and the user selection.

Figure 3A:
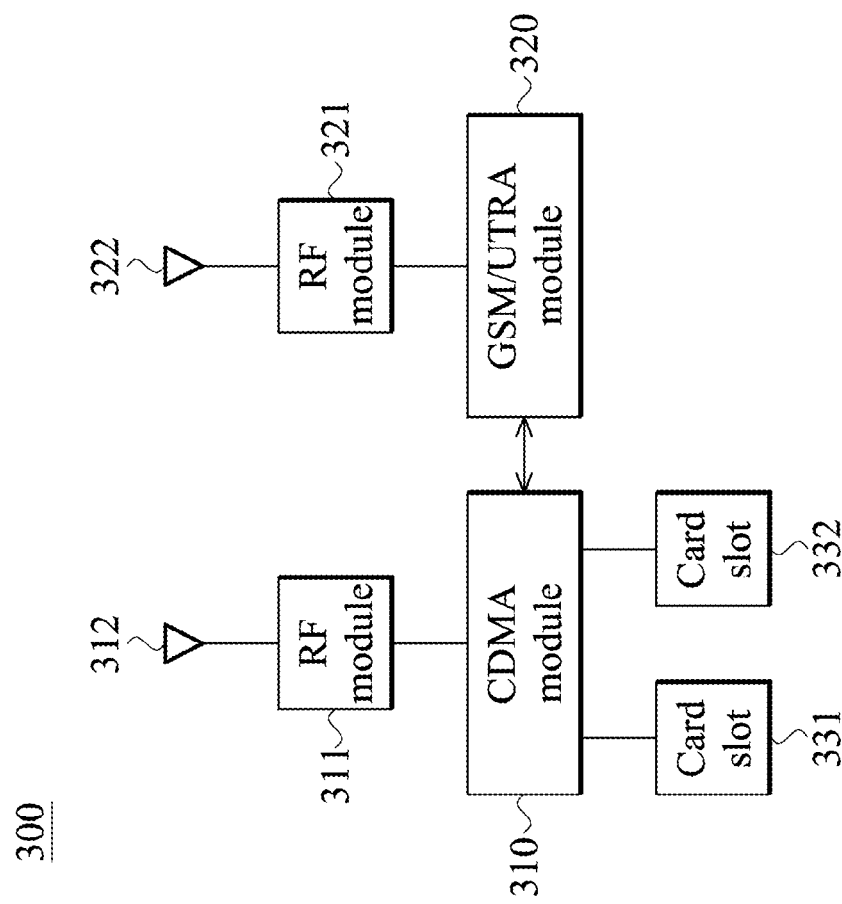
FIG. 3A is a block diagram illustrating the architecture of an MS with two card slots according to another embodiments of the invention.

FIG. 3A is a block diagram illustrating the architecture of an MS with two card slots according to another embodiment of the invention. The MS 300 comprises a CDMA module 310 coupled with two card slots 331 and 332, and a GSM/UTRA module 320. The CDMA module 310 may provide the functionality of wireless transceiving in compliance with any combination of the IS-95, CDMA2000 1x, and CDMA2000 1x EV-DO technologies, while the GSM/UTRA module 320 may provide the functionality of wireless transceiving in compliance with any combination of the GSM, GPRS, EDGE, and UTRA technologies. The UTRA technology may refer to the UTRA-FDD (including release 99, release 4, release 5, or release 6), or UTRA-TDD High Chip Rate (HCR) or Low Chip Rate (LCR) (including release 99, release 4, release 5, or release 6). Particularly, the CDMA module 310 and the GSM/UTRA module 320 are coupled with the RF modules 311 and 321, respectively, wherein the RF modules 311 and 321 are further coupled with the antenna 312 and 322, respectively. In other embodiments, the CDMA module 310 may be further coupled to one or more extra sets of an RF module and an antenna (not shown) for increasing the data rate of the wireless transceiving from and to the CDMA module 310, and likewise, the GSM/UTRA module 320 may be further coupled to one or more extra sets of an RF module and an antenna (not shown) for increasing the data rate of the wireless transceiving of the UTRA signals from and to the GSM/UTRA module 320, and the invention is not limited thereto. Note that, in this embodiment, the CDMA module 310 and the GSM/UTRA module 320 are configured as a master and a slave, respectively. That is, the CDMA module 310 is responsible for detecting the number and type of subscriber identity cards inserted in the card slots 331 and 332, and for activating the GSM/UTRA module 320 to enter the standby mode in which the functionality of wireless transceiving is enabled, if one of the detected subscriber identity cards contains a subscriber number for the GSM/UTRA module 320. As a slave, the GSM/UTRA module 320 may be initially configured to be off, and later switched to be on to enter the standby mode when activated by the CDMA module 310. As a master, the CDMA module 310 determines the working mode of the MS 300 according to the number and type of the detected subscriber identity cards. For example, if only one single-mode subscriber identity card is detected to be a SIM/USIM card, or an R-UIM card, the working mode of the MS 300 is determined to be a single communication mode in which the functionality of wireless transceiving of the CDMA module 310 is enabled with the R-UIM card or the GSM/UTRA module 320 is enabled with the SIM/USIM card. Specifically, for the case where the single-mode subscriber identity card is a SIM card, only the functionality of wireless transceiving in compliance with the GSM/GPRS/EDGE technology is enabled in the GSM/UTRA module 320; and for the case where the single-mode subscriber identity card is a USIM card, only the functionality of wireless transceiving in compliance with the UTRA technology is enabled in the GSM/UTRA module 320.

Figure 3C:
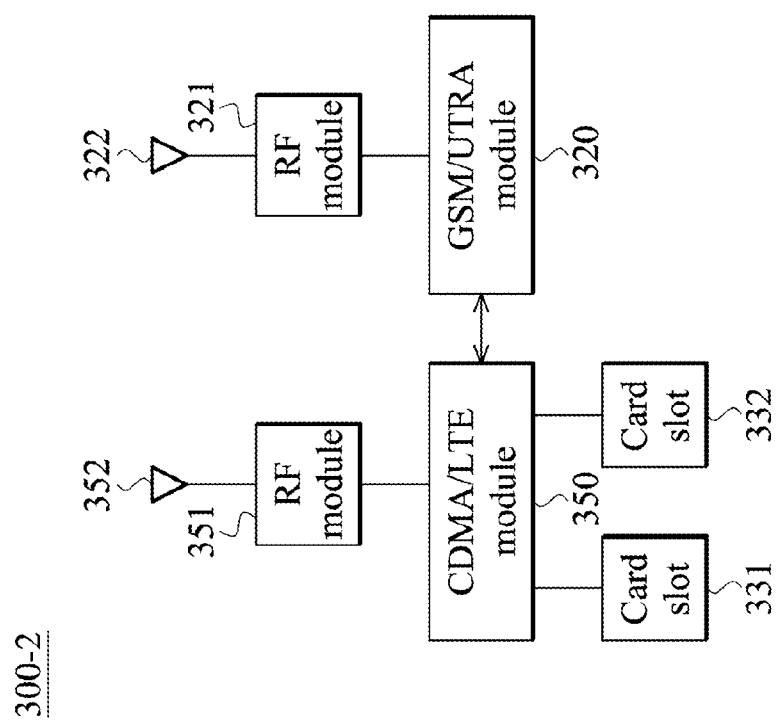
FIGS. 3B and 3C are block diagrams illustrating alternatives for the architecture of the MS in FIG. 3A.
Figure 3B:
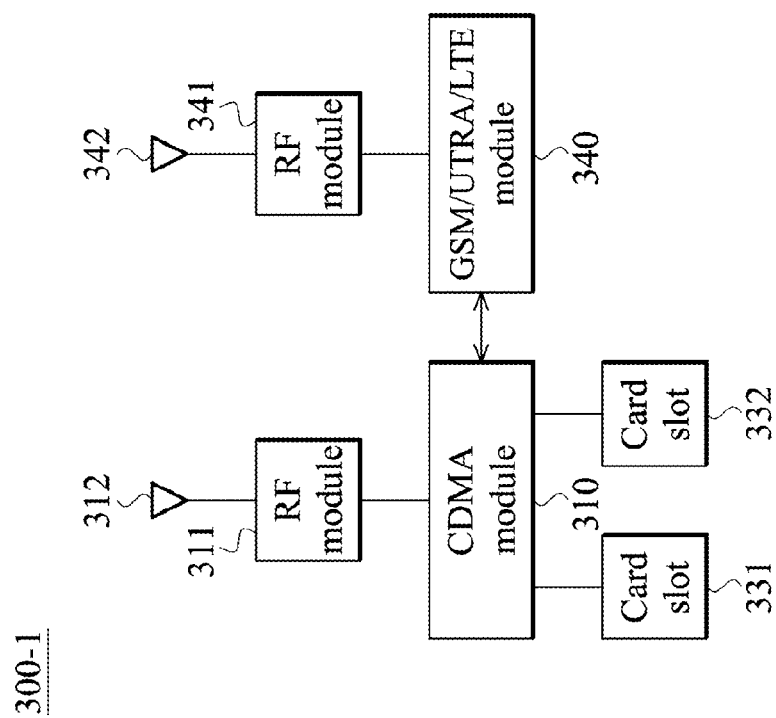

Furthermore, if two single-mode subscriber identity cards are detected to be a SIM/USIM card and an R-UIM card, or if only one dual-mode subscriber identity card supporting both the GSM/GPRS/EDGE/UTRA and the IS-95/CDMA2000 1x/CDMA2000 1x EV-DO technologies is detected, the working mode of the MS 300 is determined to be a double communication mode in which the functionalities of wireless transceiving of the CDMA module 310 and the GSM/UTRA module 320 are enabled with the R-UIM card and the SIM/USIM card, respectively, or enabled with two separate subscriber numbers read from the dual-mode subscriber identity card. If two single-mode subscriber identity cards are detected to be two SIM/USIM cards or two R-UIM cards, the working mode of the MS 300 is determined to be a double communication mode in which the functionality of wireless transceiving of the CDMA module 310 is enabled with the R-UIM cards separately or the functionality of wireless transceiving of the GSM/UTRA module 320 is enabled with the SIM/USIM cards separately. If one single-mode subscriber identity card is detected to be a SIM/USIM card and one dual-mode subscriber identity card supporting both the GSM/GPRS/EDGE/UTRA and the IS-95/CDMA2000 1x/CDMA2000 1x EV-DO technologies is detected, the working mode of the MS 300 is determined to be a triple communication mode in which the functionality of wireless transceiving of the CDMA module 310 is enabled with one subscriber number read from the dual-mode subscriber identity card and the functionality of wireless transceiving of the GSM/UTRA module 320 is enabled with the SIM/USIM card and the other subscriber number read from the dual-mode subscriber identity card. If one single-mode subscriber identity card is detected to be an R-UIM card and one dual-mode subscriber identity card supporting both the GSM/GPRS/EDGE/UTRA and the IS-95/CDMA2000 1x/CDMA2000 1x EV-DO technologies is detected, the working mode of the MS 300 is determined to be a triple communication mode in which the functionality of wireless transceiving of the CDMA module 310 is enabled with the R-UIM card and one subscriber number read from the dual-mode subscriber identity card and the functionality of wireless transceiving of the GSM/UTRA module 320 is enabled with the other subscriber number read from the dual-mode subscriber identity card. If two dual-mode subscriber identity cards supporting both the GSM/GPRS/EDGE/UTRA and the IS-95/CDMA2000 1x/CDMA2000 1x EV-DO technologies are detected, the working mode of the MS 300 is determined to be a quadruple communication mode in which the functionality of wireless transceiving of the CDMA module 310 is enabled with two subscriber numbers read from the dual-mode subscriber identity cards, respectively, and the functionality of wireless transceiving of the GSM/UTRA module 320 is enabled with the other two subscriber numbers read from the dual-mode subscriber identity cards, respectively. To further clarify, in order to enable the functionality of wireless transceiving of the CDMA module 310 or the GSM/UTRA module 320, the CDMA module 310 reads the subscriber information stored in the detected subscriber identity card(s), and further transfers the subscriber information concerning the GSM/UTRA module 320 to the GSM/UTRA module 320 if one of the detected subscriber identity cards contains a subscriber number for the GSM/UTRA module 320. In addition, the CDMA module 310 may receive subscriber information concerning the GSM/UTRA module 320 from the GSM/UTRA module 320 and stores the received subscriber information to the SIM/USIM card(s) or the dual-mode subscriber identity card(s). In another embodiment, the working mode of the MS 300 may be determined according to the previously stored working mode, or the user may manually input his/her selection for the working mode of the MS 300. Alternatively, the working mode of the MS 300 may be determined according to any combination of the number and type of the detected subscriber identity cards, the previously stored working mode, and the user selection. Note that, in one embodiment, the GSM/UTRA module 320 may be replaced with a combo communication module (denoted as a GSM/UTRA/LTE module 340) integrating the LTE module into the GSM/UTRA module 320, as shown in FIG. 3B, wherein only the functionality of wireless transceiving in compliance with the LTE technology is enabled in the GSM/UTRA/LTE module 340 if one of the detected subscriber identity contains a subscriber number for the LTE technology. The LTE technology may also refer to the LTE-Advanced, TD-LTE, or TD-LTE-Advanced technology. Alternatively, in another embodiment, the CDMA module 310 may be replaced with a combo communication module (denoted as a CDMA/LTE module 350) integrating the LTE module into the CDMA module 310, as shown in FIG. 3C, wherein only the functionality of wireless transceiving in compliance with the LTE technology is enabled in the CDMA/LTE module 350 if one of the detected subscriber identity contains a subscriber number for the LTE technology. For those skilled in the art, modifications to the operations and configurations of the GSM/UTRA/LTE module 340 and the CDMA/LTE module 350 may be contemplated according to the embodiment described above with respect to FIG. 3A.

Figure 4:
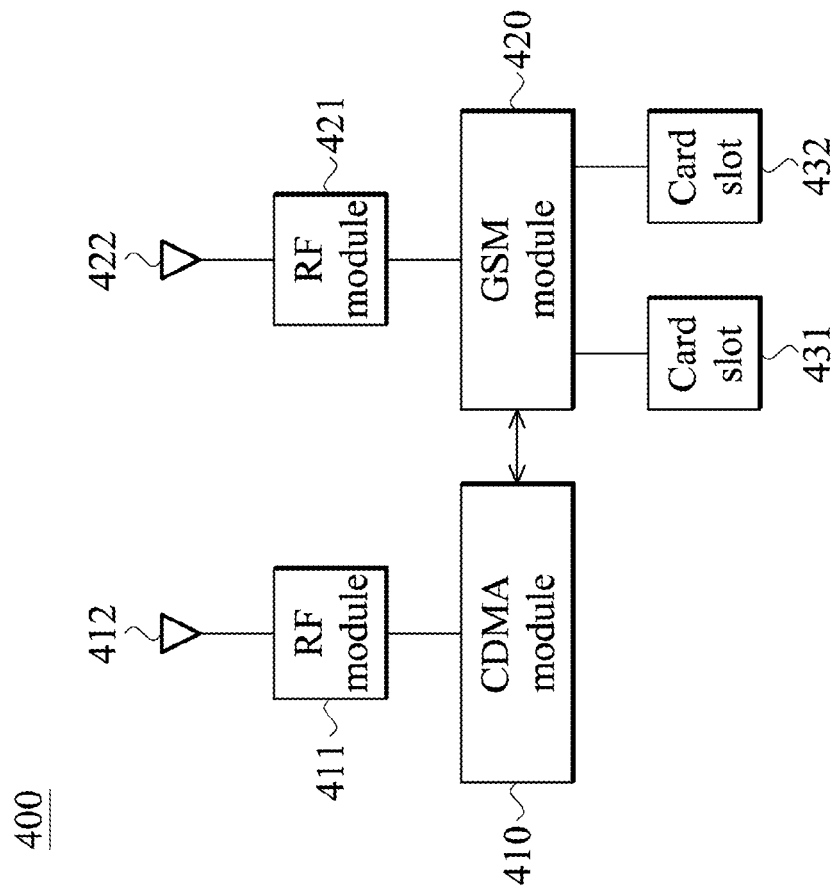
FIG. 4 is a block diagram illustrating the architecture of an MS with two card slots according to yet another embodiment of the invention.

FIG. 4 is a block diagram illustrating the architecture of an MS with two card slots according to yet another embodiment of the invention. Similar to FIG. 2, the MS 400 also comprises a CDMA module 410, a GSM module 420, and two card slots 431 and 432. However, the card slots 431 and 432 are coupled to the GSM module 420. The CDMA module 410 may provide the functionality of wireless transceiving in compliance with any combination of the IS-95, CDMA2000 1x, and CDMA2000 1x EV-DO technologies, while the GSM module 420 may provide the functionality of wireless transceiving in compliance with any combination of the GSM, GPRS, and EDGE technologies. Particularly, the CDMA module 410 and the GSM module 420 are coupled with the RF modules 411 and 421, respectively, wherein the RF modules 411 and 421 are further coupled with the antenna 412 and 422, respectively. In other embodiments, the CDMA module 410 may be further coupled to one or more extra sets of an RF module and an antenna (not shown) for increasing the data rate of the wireless transceiving from and to the CDMA module 410, and the invention is not limited thereto. Note that, in this embodiment, the CDMA module 410 and the GSM module 420 are configured as a slave and a master, respectively. That is, the GSM module 420 is responsible for detecting the number and type of subscriber identity cards inserted in the card slots 431 and 432, and for activating the CDMA module 410 to enter the standby mode in which the functionality of wireless transceiving is enabled, if one of the detected subscriber identity cards contains a subscriber number for the CDMA module 410. As a slave, the CDMA module 410 may be initially configured to be off, and later switched to be on to enter the standby mode when activated by the GSM module 420. As a master, the GSM module 420 determines the working mode of the MS 400 according to the number and type of the detected subscriber identity cards. For example, if only one single-mode subscriber identity card is detected to be a SIM card or an R-UIM card, the working mode of the MS 400 is determined to be a single mode in which the functionality of wireless transceiving of the CDMA module 410 or the GSM module 420 is enabled with the R-UIM card or the SIM card.

If two single-mode subscriber identity cards are detected to be a SIM card and an R-UIM card, or if only one dual-mode subscriber identity card supporting both the GSM/GPRS/EDGE and the IS-95/CDMA2000 1x/CDMA2000 1x EV-DO technologies is detected, the working mode of the MS 400 is determined to be a double communication mode in which the functionalities of wireless transceiving of the CDMA module 410 and the GSM module 420 are enabled with the R-UIM card and the SIM card, respectively, or enabled with two subscriber numbers read from the dual-mode subscriber identity card, respectively. If two single-mode subscriber identity cards are detected to be two SIM cards or two R-UIM cards, the working mode of the MS 400 is determined to be a double communication mode in which the functionality of wireless transceiving of the CDMA module 410 is enabled with the two R-UIM cards separately or the functionality of wireless transceiving of the GSM module 420 is enabled with the two SIM cards separately. If one single-mode subscriber identity card is detected to be a SIM card and one dual-mode subscriber identity card supporting both the GSM/GPRS/EDGE and the IS-95/CDMA2000 1x/CDMA2000 1x EV-DO technologies is detected, the working mode of the MS 400 is determined to be a triple communication mode in which the functionality of wireless transceiving of the CDMA module 410 is enabled with one subscriber number read from the dual-mode subscriber identity card and the functionality of wireless transceiving of the GSM module 420 is enabled with the SIM card and the other subscriber number read from the dual-mode subscriber identity card. If one single-mode subscriber identity card is detected to be an R-UIM card and one dual-mode subscriber identity card supporting both the GSM/GPRS/EDGE and the IS-95/CDMA2000 1x/CDMA2000 1x EV-DO technologies is detected, the working mode of the MS 400 is determined to be a triple communication mode in which the functionality of wireless transceiving of the CDMA module 410 is enabled with the R-UIM card and one subscriber number read from the dual-mode subscriber identity card and the functionality of wireless transceiving of the GSM module 420 is enabled with the other subscriber number read from the dual-mode subscriber identity card. If two dual-mode subscriber identity cards supporting both the GSM/GPRS/EDGE and the IS-95/CDMA2000 1x/CDMA2000 1x EV-DO technologies are detected, the working mode of the MS 400 is determined to be a quadruple communication mode in which the functionality of wireless transceiving of the CDMA module 410 is enabled with two subscriber numbers read from the dual-mode subscriber identity cards, respectively, and the functionality of wireless transceiving of the GSM module 420 is enabled with the other two subscriber numbers read from the dual-mode subscriber identity cards, respectively. To further clarify, in order to enable the functionality of wireless transceiving of the CDMA module 410 or the GSM module 420, the GSM module 410 reads the subscriber information stored in the detected subscriber identity card(s), and further transfers the subscriber information concerning the CDMA module 410 to the CDMA module 410 if one of the detected subscriber identity cards contains a subscriber number for the CDMA module 410. In addition, the GSM module 420 may receive subscriber information concerning the CDMA module 410 from the CDMA module 410 and store the received subscriber information to the R-UIM card(s) or the dual-mode subscriber identity card(s). In another embodiment, the working mode of the MS 400 may be determined according to the previously stored working mode, or the user may manually input his/her selection for the working mode of the MS 400. Alternatively, the working mode of the MS 400 may be determined according to any combination of the number and type of the detected subscriber identity cards, the previously stored working mode, and the user selection.

Figure 5A:
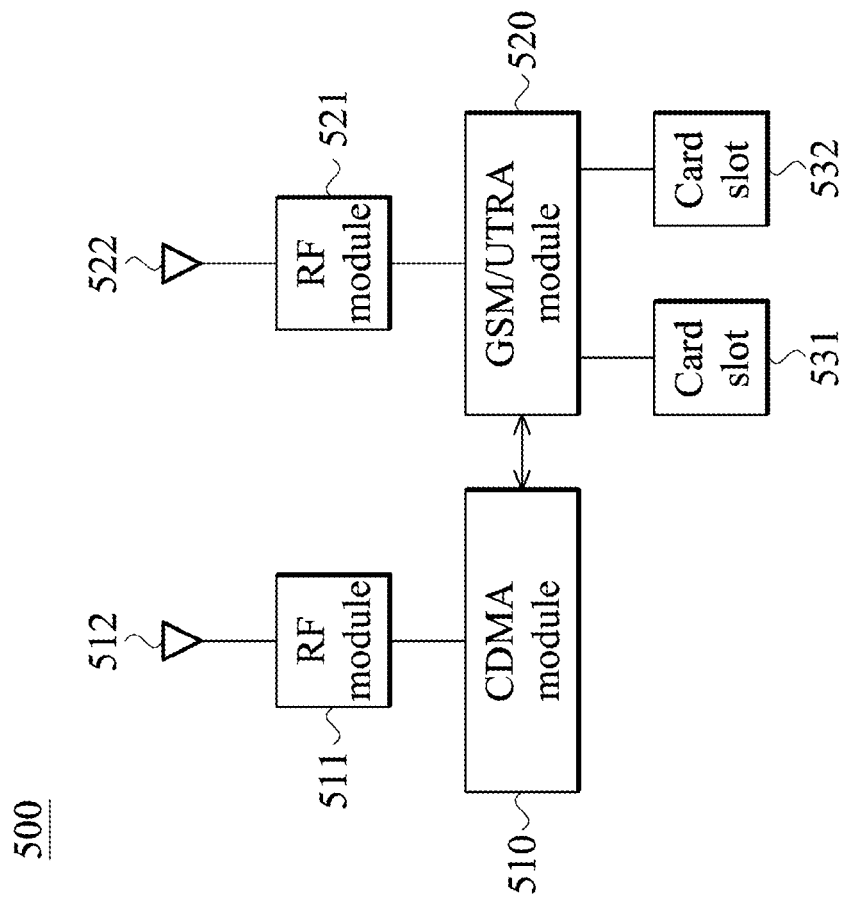
FIG. 5A is a block diagram illustrating the architecture of an MS with two card slots according to still another embodiment of the invention.

FIG. 5A is a block diagram illustrating the architecture of an MS with two card slots according to still another embodiment of the invention. The MS 500 comprises a CDMA module 510, and a GSM/UTRA module 520 coupled with two card slots 531 and 532. The CDMA module 510 may provide the functionality of wireless transceiving in compliance with any combination of the IS-95, CDMA2000 1x, and CDMA2000 1x EV-DO technologies, while the GSM/UTRA module 520 may provide the functionality of wireless transceiving in compliance with any combination of the GSM, GPRS, EDGE, and UTRA technologies. The UTRA technology may refer to the UTRA-FDD (including release 99, release 4, release 5, or release 6), or UTRA-TDD HCR or LCR (including release 99, release 4, release 5, or release 6). Particularly, the CDMA module 510 and the GSM/UTRA module 520 are coupled with the RF modules 511 and 521, respectively, wherein the RF modules 511 and 521 are further coupled with the antenna 512 and 522, respectively. In other embodiments, the CDMA module 510 may be further coupled to one or more extra sets of an RF module and an antenna (not shown) for increasing the data rate of the wireless transceiving from and to the CDMA module 510, and likewise, the GSM/UTRA module 520 may be further coupled to one or more extra sets of an RF module and an antenna (not shown) for increasing the data rate of the wireless transceiving of the UTRA signals from and to the GSM/UTRA module 520, and the invention is not limited thereto. Note that, in this embodiment, the CDMA module 510 and the GSM/UTRA module 520 are configured as a slave and a master, respectively. That is, the GSM/UTRA module 520 is responsible for detecting the number and type of subscriber identity cards inserted in the card slots 531 and 532, and for activating the CDMA module 510 to enter the standby mode in which the functionality of wireless transceiving is enabled, if one of the detected subscriber identity cards contains a subscriber number for the CDMA module 510. As a slave, the CDMA module 510 may be initially configured to be off, and later switched to be on to enter the standby mode when activated by the GSM/UTRA module 520. As a master, the GSM/UTRA module 520 determines the working mode of the MS 500 according to the number and type of the detected subscriber identity cards. For example, if only one single-mode subscriber identity card is detected to be a SIM/USIM card or an R-UIM card, the working mode of the MS 500 is determined to be a single mode in which the functionality of wireless transceiving of the CDMA module 510 or the GSM/UTRA module 520 is enabled. Specifically, for the case where the single-mode subscriber identity card is a SIM card, only the functionality of wireless transceiving in compliance with the GSM/GPRS/EDGE technology is enabled in the GSM/UTRA module 520; and for the case where the single-mode subscriber identity card is a USIM card, only the functionality of wireless transceiving in compliance with the UTRA technology is enabled in the GSM/UTRA module 520.

Furthermore, if two single-mode subscriber identity cards are detected to be a SIM/USIM card and an R-UIM card, or if only one dual-mode subscriber identity card supporting both the GSM/GPRS/EDGE/UTRA and the IS-95/CDMA2000 1x/CDMA2000 1x EV-DO technologies is detected, the working mode of the MS 500 is determined to be a double communication mode in which the functionalities of wireless transceiving of the CDMA module 510 and the GSM/UTRA module 520 are enabled with the SIM/USIM card and the R-UIM card, respectively, or enabled with two subscriber identity cards read from the dual-mode subscriber identity card, respectively. If two single-mode subscriber identity cards are detected to be two SIM/USIM cards or two R-UIM cards, the working mode of the MS 500 is determined to be a double communication mode in which the functionality of wireless transceiving of the CDMA module 510 is enabled with the R-UIM cards separately or the functionality of wireless transceiving of the GSM/UTRA module 520 is enabled with the SIM/USIM cards separately. If one single-mode subscriber identity card is detected to be a SIM/USIM card and one dual-mode subscriber identity card supporting both the GSM/GPRS/EDGE/UTRA and the IS-95/CDMA2000 1x/CDMA2000 1x EV-DO technologies is detected, the working mode of the MS 500 is determined to be a triple communication mode in which the functionality of wireless transceiving of the CDMA module 510 is enabled with one subscriber number read from the dual-mode subscriber identity card and the functionality of wireless transceiving of the GSM/UTRA module 520 is enabled with the SIM/USIM card and the other subscriber number read from the dual-mode subscriber identity card. If one single-mode subscriber identity card is detected to be an R-UIM card and one dual-mode subscriber identity card supporting both the GSM/GPRS/EDGE/UTRA and the IS-95/CDMA2000 1x/CDMA2000 1x EV-DO technologies is detected, the working mode of the MS 500 is determined to be a triple communication mode in which the functionality of wireless transceiving of the CDMA module 510 is enabled with the R-UIM card and one subscriber number read from the dual-mode subscriber identity card and the functionality of wireless transceiving of the GSM/UTRA module 520 is enabled with the other subscriber number read from the dual-mode subscriber identity card. If two dual-mode subscriber identity cards supporting both the GSM/GPRS/EDGE/UTRA and the IS-95/CDMA2000 1x/CDMA2000 1x EV-DO technologies are detected, the working mode of the MS 500 is determined to be a quadruple communication mode in which the functionality of wireless transceiving of the CDMA module 510 is enabled with two subscriber numbers read from the dual-mode subscriber identity cards, respectively, and the functionality of wireless transceiving of the GSM/UTRA module 520 is enabled with the other two subscriber numbers read from the dual-mode subscriber identity cards, respectively. To further clarify, in order to enable the functionality of wireless transceiving of the CDMA module 510 or the GSM/UTRA module 520, the GSM/UTRA module 510 reads the subscriber information stored in the detected subscriber identity card(s), and further transfers the subscriber information concerning the CDMA module 510 to the CDMA module 510 if one of the detected subscriber identity cards contains a subscriber number for the CDMA module 510. In addition, the GSM/UTRA module 520 may receive subscriber information concerning the CDMA module 510 from the CDMA module 510 and store the received subscriber information to the R-UIM card(s) or the dual-mode subscriber identity card(s). In another embodiment, the working mode of the MS 500 may be determined according to the previously stored working mode, or the user may manually input his/her selection for the working mode of the MS 500. Alternatively, the working mode of the MS 500 may be determined according to any combination of the number and type of the detected subscriber identity cards, the previously stored working mode, and the user selection. Note that, in one embodiment, the GSM/UTRA module 520 may be replaced with a combo communication module (denoted as a GSM/UTRA/LTE module 530) integrating the LTE module into the GSM/UTRA module 520, as shown in FIG. 5B, wherein only the functionality of wireless transceiving in compliance with the LTE technology is enabled in the GSM/UTRA/LTE module 530 if one of the detected subscriber identity contains a subscriber number for the LTE technology. The LTE technology may also refer to the LTE-Advanced, TD-LTE, or TD-LTE-Advanced technology. Alternatively, in another embodiment, the CDMA module 510 may be replaced with a combo communication module (denoted as a CDMA/LTE module 540) integrating the LTE module into the CDMA module 510, as shown in FIG. 5C, wherein only the functionality of wireless transceiving in compliance with the LTE technology is enabled in the CDMA/LTE module 540 if one of the detected subscriber identity contains a subscriber number for the LTE technology. For those skilled in the art, modifications to the operations and configurations of the GSM/UTRA/LTE module 530 and the CDMA/LTE module 540 may be contemplated according to the embodiment described above with respect to FIG. 5A.

FIG. 6A is a block diagram illustrating the architecture of an MS with three card slots according to an embodiment of the invention. Similar to FIGS. 2 and 4, the MS 600 also comprises a CDMA module 610 and a GSM module 620. However, there are three card slots in the MS 600, wherein the card slot 631 is coupled to the CDMA module 610 and the card slots 632 and 633 are coupled to the GSM module 620. The CDMA module 610 may provide the functionality of wireless transceiving in compliance with any combination of the IS-95, CDMA2000 1x, and CDMA2000 1x EV-DO technologies, while the GSM module 620 may provide the functionality of wireless transceiving in compliance with any combination of the GSM, GPRS, and EDGE technologies. Particularly, the CDMA module 610 and the GSM module 620 are coupled with the RF modules 611 and 621, respectively, wherein the RF modules 611 and 621 are further coupled with the antenna 612 and 622, respectively. In other embodiments, the CDMA module 610 may be further coupled to one or more extra sets of an RF module and an antenna (not shown) for increasing the data rate of the wireless transceiving from and to the CDMA module 610, and the invention is not limited thereto. Note that, in this embodiment, the CDMA module 610 and the GSM module 620 may be configured as a master and a slave, respectively, or the other way around, and both the master and slave need to detect the number and type of the subscriber identity cards inserted in the coupled card slot(s). For the case where the CDMA module 610 is configured as a master and the GSM module 620 is configured as a slave, the CDMA module 610 detects the number and type of the subscriber identity card inserted in the card slot 631 and receives information concerning the number and type of the subscriber identity cards inserted in the card slots 632 and 633 from the GSM module 620. For the case where the CDMA module 610 is configured as a slave and the GSM module 620 is configured as a master, the GSM module 620 detects the number and type of the subscriber identity cards inserted in the card slots 632 and 633 and receives information concerning the number and type of the subscriber identity card inserted in the card slot 631 from the CDMA module 610. According to the total number and type of the subscriber identity cards inserted in the card slots 631 to 633, the master then determines the working mode of the MS 600. Also, the master is responsible for activating the slave to enter the standby mode in which the functionality of wireless transceiving is enabled, if one of the detected subscriber identity cards contains a subscriber number for the slave. The slave may be initially configured to be off, and later switched to be on to enter the standby mode when activated by the master.

To further clarify, if only one single-mode subscriber identity card is detected to be a SIM card or an R-UIM card, the working mode of the MS 600 is determined to be a single communication mode in which the functionality of wireless transceiving of the CDMA module 610 or the GSM module 620 is enabled. If two single-mode subscriber identity cards are detected to be a SIM card and an R-UIM card, or if only one dual-mode subscriber identity card supporting both the GSM/GPRS/EDGE/UTRA and the IS-95/CDMA2000 1x/CDMA2000 1x EV-DO technologies is detected, the working mode of the MS 600 is determined to be a double communication mode in which the functionalities of wireless transceiving of the CDMA module 610 and the GSM module 620 are enabled with the R-UIM card and the SIM card, respectively, or enabled with two subscriber numbers read from the dual-mode subscriber identity card. If two single-mode subscriber identity cards are detected to be two SIM cards or two R-UIM cards, the working mode of the MS 600 is determined to be a double communication mode in which the functionality of wireless transceiving of the CDMA module 610 is enabled with the R-UIM cards separately or the functionality of wireless transceiving of the GSM/UTRA module 620 is enabled with the SIM cards separately. If one single-mode subscriber identity card is detected to be a SIM card and one dual-mode subscriber identity card supporting both the GSM/GPRS/EDGE and the IS-95/CDMA2000 1x/CDMA2000 1x EV-DO technologies is detected, the working mode of the MS 600 is determined to be a triple communication mode in which the functionality of wireless transceiving of the CDMA module 610 is enabled with one subscriber number read from the dual-mode subscriber identity card and the functionality of wireless transceiving of the GSM module 620 is enabled with the SIM card and the other subscriber number read from the dual-mode subscriber identity card. If one single-mode subscriber identity card is detected to be an R-UIM card and one dual-mode subscriber identity card supporting both the GSM/GPRS/EDGE and the IS-95/CDMA2000 1x/CDMA2000 1x EV-DO technologies is detected, the working mode of the MS 600 is determined to be a triple communication mode in which the functionality of wireless transceiving of the CDMA module 610 is enabled with the R-UIM card and one subscriber number read from the dual-mode subscriber identity card and the functionality of wireless transceiving of the GSM module 620 is enabled with the other subscriber number read from the dual-mode subscriber identity card. If two dual-mode subscriber identity cards supporting both the GSM/GPRS/EDGE and the IS-95/CDMA2000 1x/CDMA2000 1x EV-DO technologies are detected, the working mode of the MS 600 is determined to be a quadruple communication mode in which the functionality of wireless transceiving of the CDMA module 610 is enabled with two subscriber numbers read from the dual-mode subscriber identity cards, respectively, and the functionality of wireless transceiving of the GSM module 620 is enabled with the other two subscriber numbers read from the dual-mode subscriber identity cards, respectively.

Particularly, the MS 600 further provides multiple standby modes of the CDMA module 610 and the GSM module 620 for three separate subscriber identity cards. Specifically, if three single-mode subscriber identity cards are detected to be three SIM cards or three R-UIM cards, the working mode of the MS 600 is determined to be a triple communication mode in which the functionality of wireless transceiving of the CDMA module 610 is enabled with the three R-UIM cards separately, or the functionality of wireless transceiving of the GSM module 620 is enabled with the three SIM cards separately. If three single-mode subscriber identity cards are detected to be two SIM cards and one R-UIM card or one SIM card and two R-UIM cards, the working mode of the MS 600 is determined to be a triple communication mode in which the functionalities of wireless transceiving of the CDMA module 610 and the GSM module 620 are enabled with the R-UIM card(s) and the SIM card(s), respectively. If two dual-mode subscriber identity cards supporting both the GSM/GPRS/EDGE and the IS-95/CDMA2000 1x/CDMA2000 1x EV-DO technologies are detected and one single-mode subscriber identity card is detected to be a SIM card, the working mode of the MS 600 is determined to be a quintuple communication mode in which the functionality of wireless transceiving of the CDMA module 610 is enabled with two subscriber numbers read from the dual-mode subscriber identity cards, respectively, and the functionality of wireless transceiving of the GSM module 620 is enabled with the SIM card and the other two subscriber numbers read from the dual-mode subscriber identity cards, respectively. If two dual-mode subscriber identity cards supporting both the GSM/GPRS/EDGE and the IS-95/CDMA2000 1x/CDMA2000 1x EV-DO technologies are detected and one single-mode subscriber identity card is detected to be an R-UIM card, the working mode of the MS 600 is determined to be a quintuple communication mode in which the functionality of wireless transceiving of the CDMA module 610 is enabled with the R-UIM card and two subscriber numbers read from the dual-mode subscriber identity cards, respectively, and the functionality of wireless transceiving of the GSM module 620 is enabled with the other two subscriber numbers read from the dual-mode subscriber identity cards, respectively. If three dual-mode subscriber identity cards supporting both the GSM/GPRS/EDGE and the IS-95/CDMA2000 1x/CDMA2000 1x EV-DO technologies are detected, the working mode of the MS 600 is determined to be a sextuple communication mode in which the functionality of wireless transceiving of the CDMA module 610 is enabled with three subscriber numbers read from the dual-mode subscriber identity cards, respectively, and the functionality of wireless transceiving of the GSM module 620 is enabled with the other three subscriber numbers read from the dual-mode subscriber identity cards, respectively. Specifically, in order to enable the functionality of wireless transceiving of the CDMA module 610 or the GSM module 620, the master reads the subscriber information stored in the detected subscriber identity card(s), and further transfers the subscriber information concerning the slave to the slave if one of the detected subscriber identity cards contains a subscriber number for the slave. In addition, the working mode of the MS 600 may be determined according to the previously stored working mode, or the user may manually input his/her selection for the working mode of the MS 600. Alternatively, the working mode of the MS 600 may be determined according to any combination of the number and type of the detected subscriber identity cards, the previously stored working mode, and the user selection. Note that, in another embodiment, the card slots 631 to 633 may be coupled to the CDMA module 610 and GSM module 620 differently, as shown in FIG. 6B, wherein the card slots 631 and 632 are coupled to the CDMA module 610 while the card slot 633 is coupled to the GSM module 620. For those skilled in the art, modifications to the operations and configurations of the CDMA module 610 and the GSM module 620 with respect to different arrangements of the card slots 631 to 633 may be contemplated according to the embodiment described above with respect to FIG. 6A.

Figures 7A, 7B:
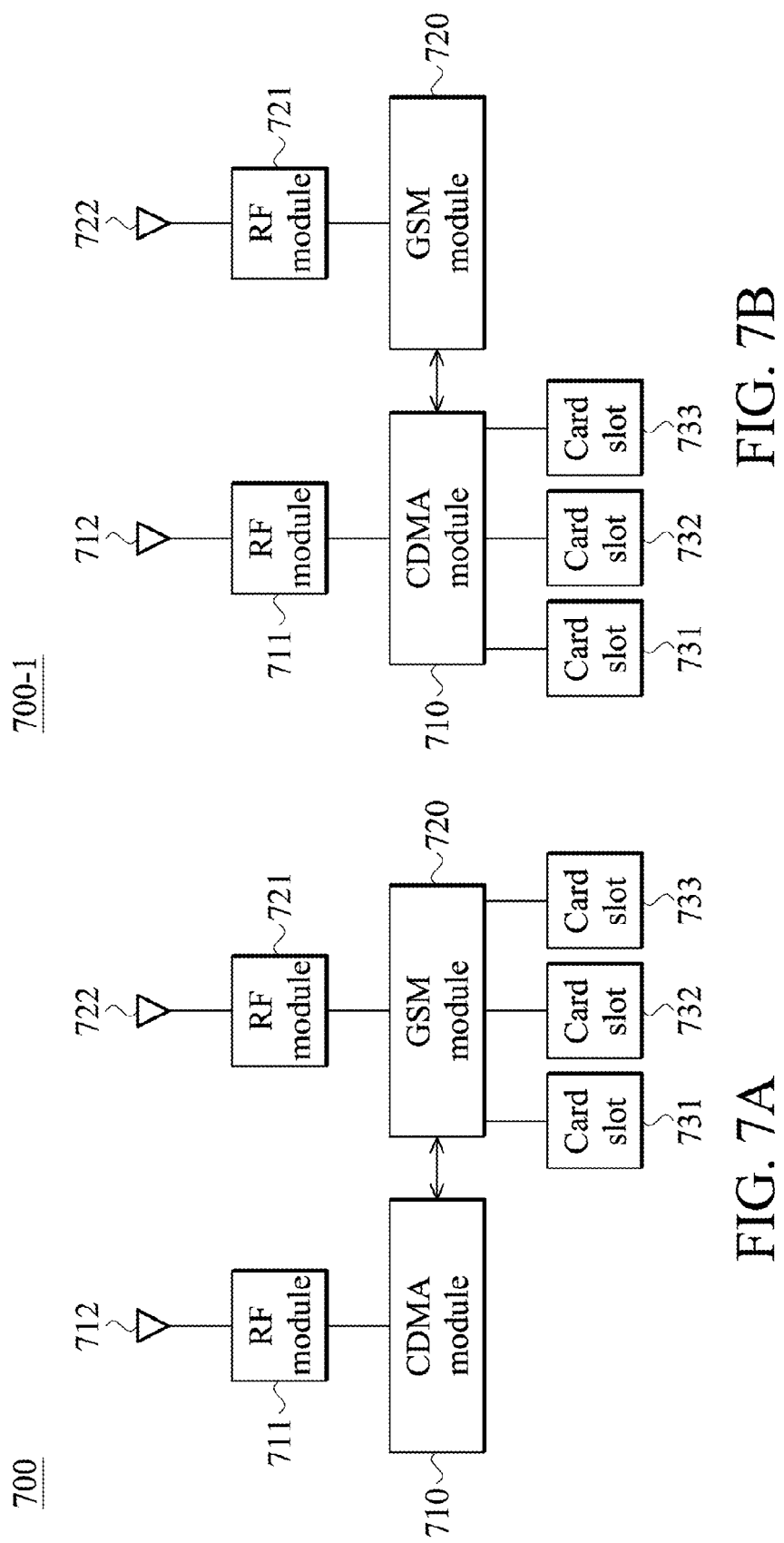
FIG. 7A is a block diagram illustrating the architecture of an MS with three card slots according to another embodiment of the invention.
FIG. 7B is a block diagram illustrating an alternative for the architecture of the MS in FIG. 7A.

FIG. 7A is a block diagram illustrating the architecture of an MS with three card slots according to another embodiment of the invention. Similar to FIGS. 6A and 6B, the MS 700 also comprises a CDMA module 710, a GSM module 720, and three card slots 731 to 733. However, in the MS 700, all of the card slots 731 to 733 are coupled to the GSM module 720. The CDMA module 710 may provide the functionality of wireless transceiving in compliance with any combination of the IS-95, CDMA2000 1x, and CDMA2000 1x EV-DO technologies, while the GSM module 720 may provide the functionality of wireless transceiving in compliance with any combination of the GSM, GPRS, and EDGE technologies. Particularly, the CDMA module 710 and the GSM module 720 are coupled with the RF modules 711 and 721, respectively, wherein the RF modules 711 and 721 are further coupled with the antenna 712 and 722, respectively. In other embodiments, the CDMA module 710 may be further coupled to one or more extra sets of an RF module and an antenna (not shown) for increasing the data rate of the wireless transceiving from and to the CDMA module 710, and the invention is not limited thereto. Note that, in this embodiment, the CDMA module 710 and the GSM module 720 are configured as a slave and a master, respectively. As a master, the GSM module 720 is responsible for detecting the number and type of the subscriber identity cards inserted in the card slots 731 to 733, and for activating the CDMA module 710 to enter the standby mode in which the functionality of wireless transceiving is enabled, if one of the detected subscriber identity cards contains a subscriber number for the CDMA module 710. The CDMA module 710 may be initially configured to be off, and later switched to be on to enter the standby mode when activated by the GSM module 720.

To further clarify, if only one single-mode subscriber identity card is detected to be a SIM card or an R-UIM card, the working mode of the MS 700 is determined to be a single mode in which the functionality of wireless transceiving of the CDMA module 710 or the GSM module 720 is enabled with the R-UIM card or the SIM card. If two single-mode subscriber identity cards are detected to be a SIM card and an R-UIM card, or if only one dual-mode subscriber identity card supporting both the GSM/GPRS/EDGE and the IS-95/CDMA2000 1x/CDMA2000 1x EV-DO technologies is detected, the working mode of the MS 700 is determined to be a double communication mode in which the functionalities of wireless transceiving of the CDMA module 710 and the GSM module 720 are enabled with the R-UIM card and the SIM card, respectively, or enabled with two subscriber numbers read from the dual-mode subscriber identity card, respectively. If two single-mode subscriber identity cards are detected to be two SIM cards or two R-UIM cards, the working mode of the MS 700 is determined to be a double communication mode in which the functionality of wireless transceiving of the CDMA module 710 is enabled with the two R-UIM cards separately, or the functionality of wireless transceiving of the GSM module 720 is enabled with the two SIM cards separately. If one single-mode subscriber identity card is detected to be a SIM card and one dual-mode subscriber identity card supporting both the GSM/GPRS/EDGE and the IS-95/CDMA2000 1x/CDMA2000 1x EV-DO technologies is detected, the working mode of the MS 700 is determined to be a triple communication mode in which the functionality of wireless transceiving of the CDMA module 710 is enabled with one subscriber number read from the dual-mode subscriber identity card and the functionality of wireless transceiving of the GSM module 720 is enabled with the SIM card and the other subscriber number read from the dual-mode subscriber identity card. If one single-mode subscriber identity card is detected to be an R-UIM card and one dual-mode subscriber identity card supporting both the GSM/GPRS/EDGE and the IS-95/CDMA2000 1x/CDMA2000 1x EV-DO technologies is detected, the working mode of the MS 700 is determined to be a triple communication mode in which the functionality of wireless transceiving of the CDMA module 710 is enabled with the R-UIM card and one subscriber number read from the dual-mode subscriber identity card and the functionality of wireless transceiving of the GSM module 720 is enabled with the other subscriber number read from the dual-mode subscriber identity card. If two dual-mode subscriber identity cards supporting both the GSM/GPRS/EDGE and the IS-95/CDMA2000 1x/CDMA2000 1x EV-DO technologies are detected, the working mode of the MS 700 is determined to be a quadruple communication mode in which the functionality of wireless transceiving of the CDMA module 710 is enabled with two subscriber numbers read from the dual-mode subscriber identity cards, respectively, and the functionality of wireless transceiving of the GSM module 720 is enabled with the other two subscriber numbers read from the dual-mode subscriber identity cards, respectively.

Particularly, the MS 700 further provides multiple standby modes of the CDMA module 710 and the GSM module 720 for three separate subscriber identity cards. Specifically, if three single-mode subscriber identity cards are detected to be three SIM cards or three R-UIM cards, the working mode of the MS 700 is determined to be a triple communication mode in which the functionality of wireless transceiving of the CDMA module 710 is enabled with the three R-UIM cards separately, or the functionality of wireless transceiving of the GSM module 720 is enabled with the three SIM cards separately. If three single-mode subscriber identity cards are detected to be two SIM cards and one R-UIM card or one SIM card and two R-UIM cards, the working mode of the MS 700 is determined to be a triple communication mode in which the functionalities of wireless transceiving of the CDMA module 710 and the GSM module 720 are enabled with the R-UIM card(s) and the SIM card(s), respectively. If two dual-mode subscriber identity cards supporting both the GSM/GPRS/EDGE and the IS-95/CDMA2000 1x/CDMA2000 1x EV-DO technologies are detected and one single-mode subscriber identity card is detected to be a SIM card, the working mode of the MS 700 is determined to be a quintuple communication mode in which the functionality of wireless transceiving of the CDMA module 710 is enabled with two subscriber numbers read from the dual-mode subscriber identity cards, respectively, and the functionality of wireless transceiving of the GSM module 720 is enabled with the SIM card and the other two subscriber numbers read from the dual-mode subscriber identity cards, respectively. If two dual-mode subscriber identity cards supporting both the GSM/GPRS/EDGE and the IS-95/CDMA2000 1x/CDMA2000 1x EV-DO technologies are detected and one single-mode subscriber identity card is detected to be an R-UIM card, the working mode of the MS 700 is determined to be a quintuple communication mode in which the functionality of wireless transceiving of the CDMA module 710 is enabled with the R-UIM card and two subscriber numbers read from the dual-mode subscriber identity cards, respectively, and the functionality of wireless transceiving of the GSM module 720 is enabled with the other two subscriber numbers read from the dual-mode subscriber identity cards, respectively. If three dual-mode subscriber identity cards supporting both the GSM/GPRS/EDGE and the IS-95/CDMA2000 1x/CDMA2000 1x EV-DO technologies are detected, the working mode of the MS 700 is determined to be a sextuple communication mode in which the functionality of wireless transceiving of the CDMA module 710 is enabled with three subscriber numbers read from the dual-mode subscriber identity cards, respectively, and the functionality of wireless transceiving of the GSM module 720 is enabled with the other three subscriber numbers read from the dual-mode subscriber identity cards, respectively. Specifically, in order to enable the functionality of wireless transceiving of the CDMA module 710 or the GSM module 720, the GSM module 710 reads the subscriber information stored in the detected subscriber identity card(s), and further transfers the subscriber information concerning the CDMA module 710 to the CDMA module 710 if one of the detected subscriber identity cards contains a subscriber number for the CDMA module 710. In addition, the GSM module 720 may receive subscriber information concerning the CDMA module 710 from the CDMA module 710 and store the received subscriber information to the R-UIM card(s) or the dual-mode subscriber identity card(s). In another embodiment, the working mode of the MS 700 may be determined according to the previously stored working mode, or the user may manually input his/her selection for the working mode of the MS 700. Alternatively, the working mode of the MS 700 may be determined according to any combination of the number and type of the detected subscriber identity cards, the previously stored working mode, and the user selection. Note that, in another embodiment, the card slots 731 to 733 may be coupled to the CDMA module 710 instead of the GSM module 720, as shown in FIG. 7B, wherein the CDMA module 710 and the GSM module 720 are instead configured to be a master and a slave, respectively. For those skilled in the art, modifications to the operations and configurations of the CDMA module 710 and the GSM module 720 may be contemplated according to the embodiment described above with respect to FIG. 7A.

Figure 8:
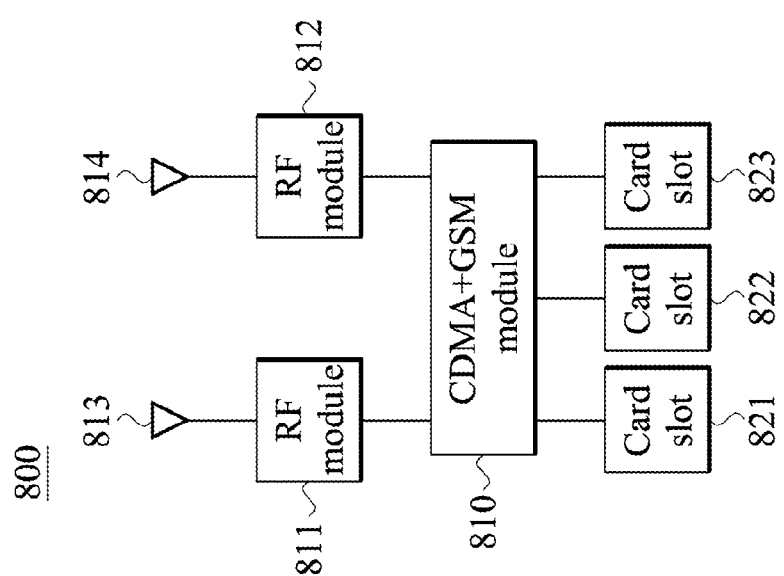
FIG. 8 is a block diagram illustrating the architecture of an MS with three card slots according to yet another embodiment of the invention.

FIG. 8 is a block diagram illustrating the architecture of an MS with three card slots according to yet another embodiment of the invention. Unlike FIGS. 7A and 7B, the CDMA module and the GSM module are integrated into a CDMA+GSM combo module 810, and three card slots 821 to 823 are coupled to the CDMA+GSM combo module 810. The CDMA+GSM combo module 810 may provide the functionalities of wireless transceiving in compliance with both the CDMA technology (including any combination of the IS-95, CDMA2000 1x, and CDMA2000 1x EV-DO technologies) and the GSM/GPRS/EDGE technology (including any combination of the GSM, GPRS, and EDGE technologies). Particularly, the CDMA+GSM combo module 810 is coupled with the RF modules 811 and 812, wherein the RF modules 811 and 812 are further coupled with the antenna 813 and 814 for transceiving CDMA and GSM/GPRS/EDGE signals, respectively. In other embodiments, the CDMA+GSM combo module 810 may be further coupled to one or more extra sets of an RF module and an antenna (not shown) for increasing the data rate of the wireless transceiving for CDMA, and the invention is not limited thereto. Since the CDMA module and the GSM module are integrated into the CDMA+GSM combo module 810, the CDMA+GSM combo module 810 is responsible for detecting the number and type of the subscriber identity cards inserted in the card slots 821 to 823, and for enabling the functionality of wireless transceiving for CDMA and/or GSM/GPRS/EDGE. For example, the functionality of wireless transceiving for CDMA is enabled if one of the detected subscriber identity cards contains a subscriber number for CDMA, and the functionality of wireless transceiving for GSM/GPRS/EDGE is enabled if one of the detected subscriber identity cards contains a subscriber number for GSM/GPRS/EDGE. The functionalities of wireless transceiving for CDMA signals and GSM signals may be initially configured to be off, and later switched to be on when enabled by the CDMA+GSM combo module 810.

Regarding the operations of whether to enable the functionalities of wireless transceiving for CDMA signals and GSM signals, reference may be made to the detailed descriptions with respect to FIGS. 7A and 7B.

Figure 9:
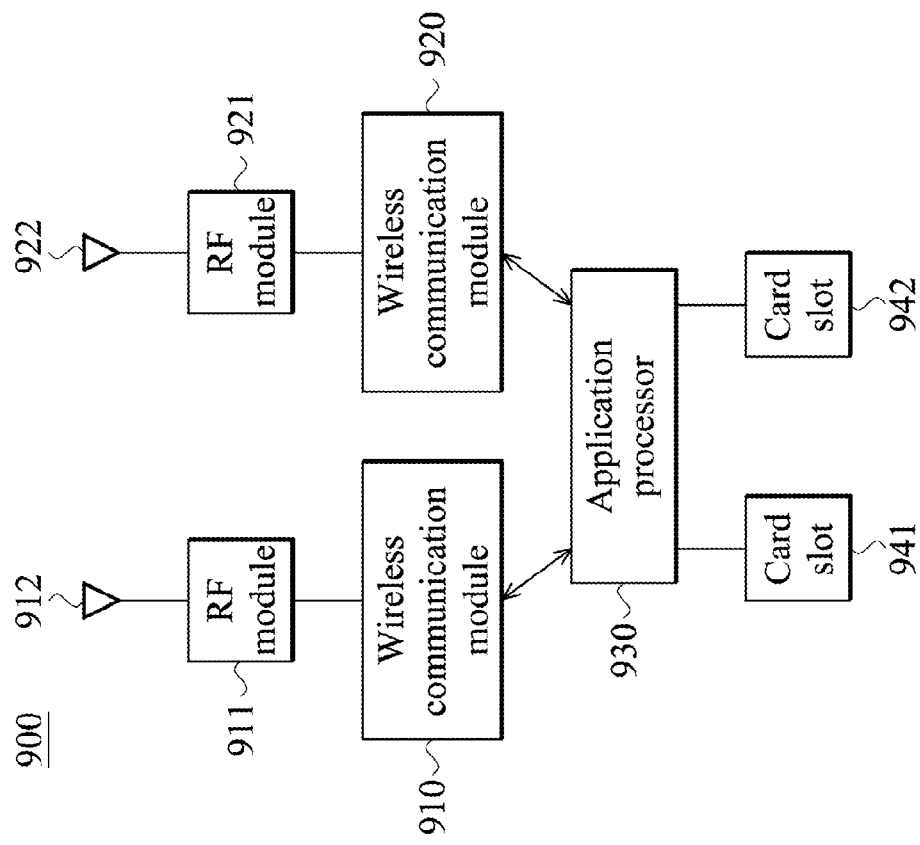
FIG. 9 is a block diagram illustrating the architecture of an MS with an application processor according to an embodiment of the invention.

FIG. 9 is a block diagram illustrating the architecture of an MS with an application processor according to an embodiment of the invention. As shown in FIG. 9, the MS 900 comprises two communication modules 910 and 920, and an application processor 930 for coordinating the operations of the communication modules 910 and 920 according to the subscriber identity cards inserted in the card slots 941 and 942. In this embodiment, there are two card slots 941 and 942 coupled to the application processor 930, while in other embodiments, there may be more than two card slots coupled to the application processor 930, and the invention is not limited thereto. The communication module 910 may provide the functionality of wireless transceiving in compliance with the CDMA technology (including any combination of the IS-95, CDMA2000 1x, and CDMA2000 1x EV-DO technologies), while the communication module 920 may provide the functionality of wireless transceiving in compliance with the GSM technology (including any combination of the GSM, GPRS, and EDGE technologies), the UTRA or LTE technology. The communication modules 910 and 920 are coupled with the RF modules 911 and 921, respectively, wherein the RF modules 911 and 921 are further coupled with the antenna 912 and 922, respectively. In other embodiments, each of the communication modules 910 and 920 may be further coupled to one or more extra sets of an RF module and an antenna (not shown) for increasing the data rate of the wireless transceiving, and the invention is not limited thereto. The application processor 930 may be a general-purpose processor, a Micro Control Unit (MCU), or others, which loads and executes a series of program codes from a memory unit (not shown) or storage device (not shown) to provide control of the communication modules 910 and 920 in the MS 900. Specifically, the application processor 930 is responsible for detecting the number and type of the subscriber identity cards inserted in the card slots 941 and 942, and for activating the communication modules 910 and 920 to enter the standby mode in which the functionality of wireless transceiving is enabled, if the detected subscriber identity card(s) contains subscriber numbers for the communication modules 910 and 920. Regarding the operations of whether to activate the communication modules 910 and/or 920, references may be made to the detailed descriptions with respect to FIGS. 2, 3A to 3C, 4, and 5A to 5C. Alternatively, for the case where 3 card slots are coupled to the application processor 930, references regarding the operations of whether to activate the communication modules 910 and/or 920 may be made to the detailed descriptions with respect to FIGS. 6A, 6B, 7A, 7B, and 8.

Figure 10:
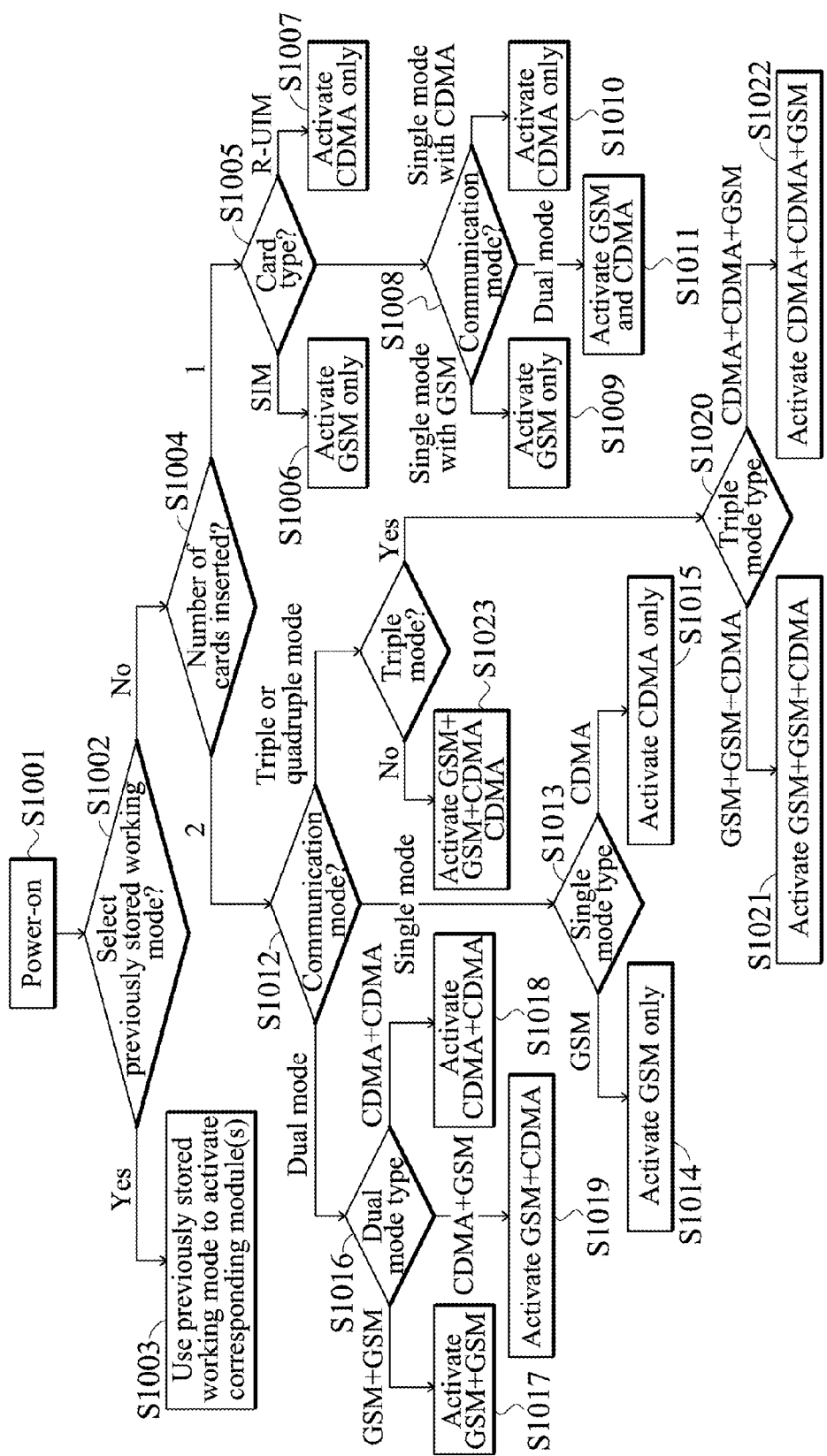
FIG. 10 is a flow chart illustrating an embodiment of the method for coordinating the operations between two communication modules with respect to the architectures shown in FIGS. 2 and 4.

FIG. 10 is a flow chart illustrating an embodiment of the method for coordinating the operations between two communication modules with respect to the architectures shown in FIGS. 2 and 4. In this embodiment, the method is applied in a wireless communications device, such as the MS 200 or the MS 400, which comprises two card slots, a CDMA module, and a GSM module, wherein each of the CDMA module and the GSM module is coupled with a respective set of an RF module and an antenna for wireless transceiving. To begin, the wireless communications device is powered on and a series of initialization processes, including booting up of the operating system, initializing of the master among the communication modules, and activating of the coupled functional modules (such as the RF module and the antenna coupled with the master), etc., are performed (step S1001). For example, the master may be the CDMA module 210 in the embodiment shown in FIG. 2, or the master may be the GSM module 420 in the embodiment shown in FIG. 4. After the initialization processes are finished, the wireless communications device may prompt the user on whether to select the previously stored working mode or not (step S1002). The previously stored working mode may refer to the working mode used before the last power-off operation of the wireless communications device. If the user selects the previously stored working mode, the master among the communication modules activates the slave accordingly (step S1003). If the user does not select the previously stored working mode, the master among the communication modules detects the number of subscriber identity cards inserted in the card slots (step S1004). For the case where only 1 subscriber identity card is detected, the master then determines the type of the detected subscriber identity card (step S1005). If it is a SIM card, the GSM module is activated or turned on and the functionality of wireless transceiving therein is enabled with the SIM card (step S1006). If it is an R-UIM card, the CDMA module is activated or turned on and the functionality of wireless transceiving therein is enabled with the R-UIM card (step S1007). Otherwise, if it is a dual-mode subscriber identity card, the wireless communications device further prompts the user to select the communication mode (step S1008). Specifically, the dual-mode subscriber identity card comprises two subscriber numbers for CDMA and GSM technologies, respectively. If the user selects a single communication mode with the GSM module, the GSM module is activated or turned on and the functionality of wireless transceiving therein is enabled with the subscriber number for GSM technology read from the dual-mode subscriber identity card (step S1009). If the user selects a single communication mode with the CDMA module, the CDMA module is activated or turned on and the functionality of wireless transceiving therein is enabled with the subscriber number for CDMA technology read from the dual-mode subscriber identity card (step S1010). Otherwise, if the user selects a double communication mode, both the CDMA module and the GSM module are activated or turned on and the functionalities of wireless transceiving therein are enabled with the two subscriber numbers read from the dual-mode subscriber identity card (step S1011).

Subsequent to step S1004, if two subscriber identity cards are detected, the master continues to prompt the user to select the communication mode (step S1012). Specifically, the user may select the communication mode according to any combination of the number and type of the detected subscriber identity cards, and the type of subscriber numbers. If the user selects a single communication mode, the master further determines whether the single communication mode is selected with the GSM module or the CDMA module (step S1013). If the single communication mode is selected with the GSM module (i.e., a SIM card, or a subscriber number for GSM in a dual-mode subscriber identity card is selected by user), the GSM module is activated or turned on and the functionality of wireless transceiving therein is enabled with a SIM card or the subscriber number for GSM technology read from a dual-mode subscriber identity card (step S1014). If the single communication mode is selected with the CDMA module (i.e., an R-UIM card, or a subscriber number for CDMA in a dual-mode subscriber identity card is selected by user), the CDMA module is activated or turned on and the functionality of wireless transceiving therein is enabled with an R-UIM card or the subscriber number for CDMA technology read from a dual-mode subscriber identity card (step S1015).

Subsequent to step S1012, if the user selects a double communication mode, the master further determines the type of the double communication mode (step S1016). If the type of the double communication mode is selected with only the GSM module, the GSM module is activated or turned on and the functionality of wireless transceiving therein is enabled with two SIM cards, two subscriber numbers for GSM technology read from a dual-mode subscriber identity card, or one SIM card and one subscriber number for GSM technology read from a dual-mode subscriber identity card, respectively (step S1017). If the type of the double communication mode is selected with only the CDMA module, the CDMA module is activated or turned on and the functionality of wireless transceiving therein is enabled with two R-UIM cards, two subscriber numbers for CDMA technology read from a dual-mode subscriber identity card, or an R-UIM card and one subscriber number for CDMA technology read from a dual-mode subscriber identity card, respectively (step S1018). Otherwise, if the type of the double communication mode is selected with both the CDMA module and the GSM module, the CDMA module and the GSM module are activated or turned on and the functionalities of wireless transceiving therein are enabled with an R-UIM card and a SIM card, two subscriber numbers for CDMA and GSM read from a dual-mode subscriber identity card, one subscriber number for CDMA technology read from a dual-mode subscriber identity card and a SIM card, or an R-UIM card and one subscriber number for GSM technology read from a dual-mode subscriber identity card, respectively (step S1019).

Subsequent to step S1012, if the user selects a triple communication mode, the master further determines the type of the triple communication mode (step S1020). If the type of the triple communication mode is selected with double GSM and single CDMA, the CDMA module is activated or turned on and the functionality of wireless transceiving therein is enabled with an R-UIM card or one subscriber number for CDMA technology read from a dual-mode subscriber identity card, while the GSM module is activated or turned on and the functionality of wireless transceiving therein is enabled with a SIM card and one subscriber number for GSM technology read from a dual-mode subscriber identity card, or two subscriber numbers for GSM technology read from two dual-mode subscriber identity cards, respectively (step S1021). If the type of the triple communication mode is selected with single GSM and double CDMA, the CDMA module is activated or turned on and the functionality of wireless transceiving therein is enabled with an R-UIM card and one subscriber number for CDMA technology read from a dual-mode subscriber identity card, or two subscriber numbers for CDMA technology read from two dual-mode subscriber identity cards, respectively, while the GSM module is activated or turned on and the functionality of wireless transceiving therein is enabled with a SIM card or one subscriber number for GSM technology read from a dual-mode subscriber identity card (step S1022). Subsequent to step S1012, if the user selects a quadruple communication mode, the CDMA module is activated or turned on and the functionality of wireless transceiving therein is enabled with two subscriber numbers for CDMA technology read from two dual-mode subscriber identity cards, respectively, while the GSM module is activated or turned on and the functionality of wireless transceiving therein is enabled with two subscriber numbers for GSM technology read from two dual-mode subscriber identity cards, respectively (step S1023).

Figure 11:
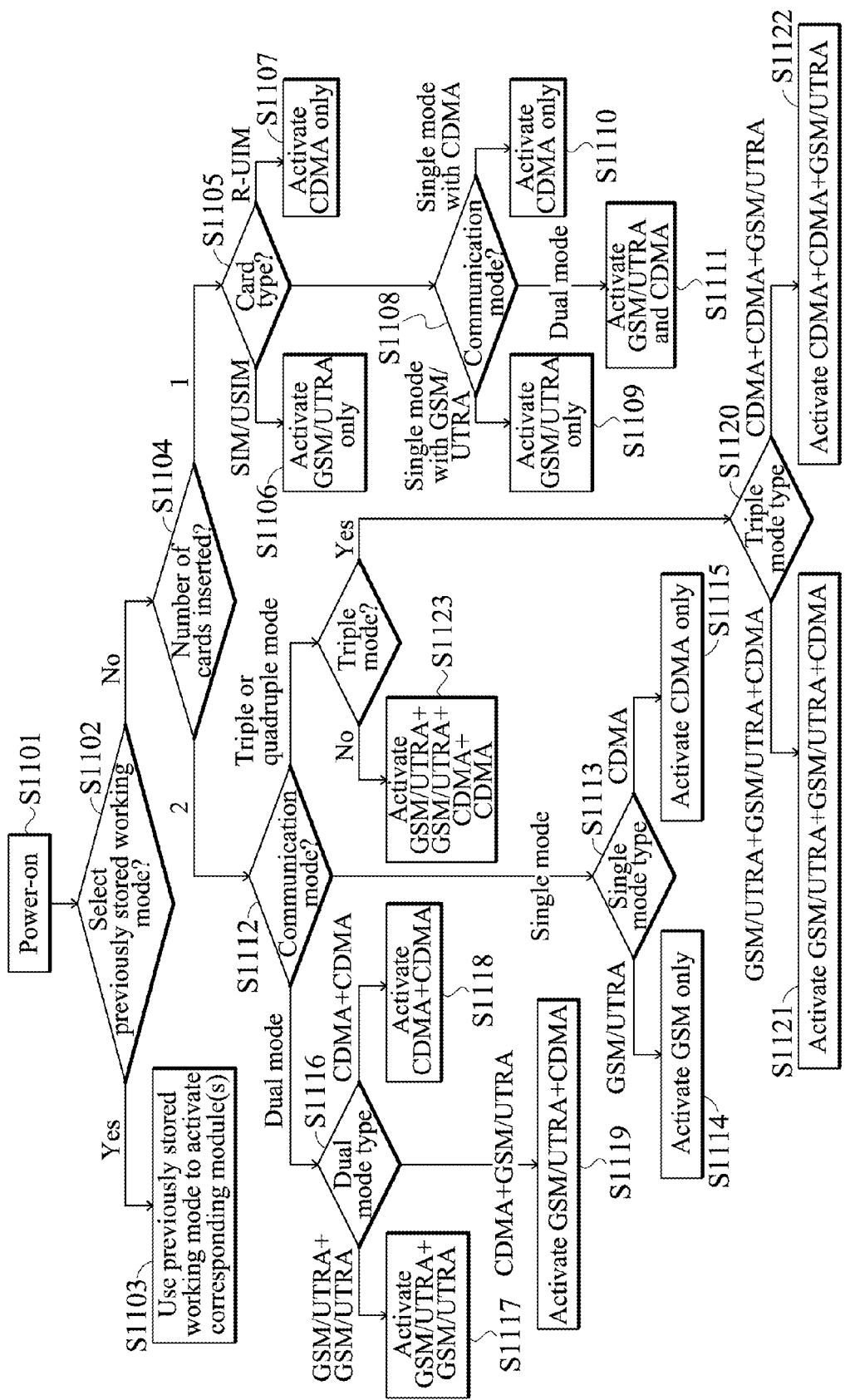
FIG. 11 is a flow chart illustrating an embodiment of the method for coordinating the operations between two communication modules with respect to the architectures shown in FIGS. 3A and 5A.

FIG. 11 is a flow chart illustrating an embodiment of the method for coordinating the operations between two communication modules with respect to the architectures shown in FIGS. 3A and 5A. In this embodiment, the method is applied in a wireless communications device, such as the MS 300 or the MS 500, which comprises two card slots, a CDMA module, and a GSM/UTRA module, wherein each of the CDMA module and the GSM/UTRA module is coupled with a respective set of an RF module and an antenna for wireless transceiving. To begin, the wireless communications device is powered on and a series of initialization processes, including booting up of the operating system, initializing of the master among the communication modules, and activating of the coupled functional modules (such as the RF module and the antenna coupled with the master), etc., are performed (step S1101). For example, the master may be the CDMA module 310 in the embodiment shown in FIG. 3A, or the master may be the GSM/UTRA module 520 in the embodiment shown in FIG. 5A. After the initialization processes are finished, the wireless communications device may prompt the user on whether to select the previously stored working mode or not (step S1102). The previously stored working mode may refer to the working mode used before the last power-off operation of the wireless communications device. If the user selects the previously stored working mode, the master among the communication modules activates the slave accordingly (step S1103). If the user does not select the previously stored working mode, the master among the communication modules detects the number of subscriber identity cards inserted in the card slots (step S1104). For the case where only 1 subscriber identity card is detected, the master then determines the type of the detected subscriber identity card (step S1105). If it is a SIM/USIM card, the GSM/UTRA module is activated or turned on and the functionality of wireless transceiving therein is enabled with the SIM/USIM card (step S1106). Specifically, if the detected subscriber identity card is a SIM card, then only the functionality of wireless transceiving in compliance with the GSM/GPRS/EDGE technology is enabled in the GSM/UTRA module. Otherwise, if the detected subscriber identity card is a USIM card, then only the functionality of wireless transceiving in compliance with the UTRA technology is enabled in the GSM/UTRA module. If the detected subscriber identity card is an R-UIM card, the CDMA module is activated or turned on and the functionality of wireless transceiving therein is enabled with the R-UIM card (step S1107). Otherwise, if it is a dual-mode subscriber identity card, the wireless communications device further prompts the user to select the communication mode (step S1108). Specifically, the dual-mode subscriber identity card comprises two subscriber numbers for CDMA and GSM technologies, respectively. If the user selects a single communication mode with the GSM/UTRA module, the GSM/UTRA module is activated or turned on and the functionality of wireless transceiving therein is enabled with the subscriber number for GSM/UTRA read from the dual-mode subscriber identity card (step S1109). If the user selects a single communication mode with the CDMA module, the CDMA module is activated or turned on and the functionality of wireless transceiving therein is enabled with the subscriber number for CDMA technology read from the dual-mode subscriber identity card (step S1110). Otherwise, if the user selects a double communication mode, both the CDMA module and the GSM/UTRA module are activated or turned on and the functionalities of wireless transceiving therein are enabled with the two subscriber numbers read from the dual-mode subscriber identity card (step S1111).

Subsequent to step S1104, if two subscriber identity cards are detected, the master continues to prompt the user to select the communication mode (step S1112). Specifically, the user may select the communication mode according to any combination of the number and type of the detected subscriber identity cards, and the type of subscriber numbers. If the user selects a single communication mode, the master further determines whether the single communication mode is selected with the GSM/UTRA module or the CDMA module (step S1113). If the single communication mode is selected with the GSM/UTRA module (i.e., a SIM/USIM card, or a subscriber number for GSM/UTRA in a dual-mode subscriber identity card is selected by user), the GSM/UTRA module is activated or turned on and the functionality of wireless transceiving therein is enabled with a SIM/USIM card or the subscriber number for GSM/UTRA read from a dual-mode subscriber identity card (step S1114). If the single communication mode is selected with the CDMA module (i.e., an R-UIM card, or a subscriber number for CDMA in a dual-mode subscriber identity card is selected by user), the CDMA module is activated or turned on and the functionality of wireless transceiving therein is enabled with an R-UIM card or the subscriber number for CDMA technology read from a dual-mode subscriber identity card (step S1115).

Subsequent to step S1112, if the user selects a double communication mode, the master further determines the type of the double communication mode (step S1116). If the type of the double communication mode is selected with only the GSM/UTRA module, the GSM/UTRA module is activated or turned on and the functionality of wireless transceiving therein is enabled with two SIM/USIM cards, two subscriber numbers for GSM/UTRA read from a dual-mode subscriber identity card, or one SIM/USIM card and one subscriber number for GSM/UTRA read from a dual-mode subscriber identity card, respectively (step S1117). If the type of the double communication mode is selected with only the CDMA module, the CDMA module is activated or turned on and the functionality of wireless transceiving therein is enabled with two R-UIM cards, two subscriber numbers for CDMA technology read from a dual-mode subscriber identity card, or an R-UIM card and one subscriber number for CDMA technology read from a dual-mode subscriber identity card, respectively (step S1118). Otherwise, if the type of the double communication mode is selected with both the CDMA module and the GSM/UTRA module, the CDMA module and the GSM/UTRA module are activated or turned on and the functionalities of wireless transceiving therein are enabled with an R-UIM card and a SIM/USIM card, two subscriber numbers for CDMA and GSM/UTRA read from a dual-mode subscriber identity card, one subscriber number for CDMA technology read from a dual-mode subscriber identity card and a SIM/USIM card, or an R-UIM card and one subscriber number for GSM/UTRA read from a dual-mode subscriber identity card, respectively (step S1119).

Subsequent to step S1112, if the user selects a triple communication mode, the master further determines the type of the triple communication mode (step S1120). If the type of the triple communication mode is selected with double GSM/UTRA and single CDMA, the CDMA module is activated or turned on and the functionality of wireless transceiving therein is enabled with an R-UIM card or one subscriber number for CDMA technology read from a dual-mode subscriber identity card, while the GSM/UTRA module is activated or turned on and the functionality of wireless transceiving therein is enabled with a SIM/USIM card and one subscriber number for GSM/UTRA read from a dual-mode subscriber identity card, or two subscriber numbers for GSM/UTRA read from two dual-mode subscriber identity cards, respectively (step S1121). Specifically, the functionality of wireless transceiving enabled in the GSM/UTRA module is in compliance with any two of the GSM, GPRS, EDGE, UTRA-FDD (including release 99, release 4, release 5, or release 6), and UTRA-TDD HCR or LCR (including release 99, release 4, release 5, or release 6) technologies. If the type of the triple communication mode is selected with single GSM/UTRA and double CDMA, the CDMA module is activated or turned on and the functionality of wireless transceiving therein is enabled with an R-UIM card and one subscriber number for CDMA technology read from a dual-mode subscriber identity card, or two subscriber numbers for CDMA technology read from two dual-mode subscriber identity cards, respectively, while the GSM/UTRA module is activated or turned on and the functionality of wireless transceiving therein is enabled with a SIM/USIM card or one subscriber number for GSM/UTRA read from a dual-mode subscriber identity card (step S1122). Specifically, the functionality of wireless transceiving enabled in the CDMA module is in compliance with any two of the IS-95, CDMA2000 1x, and CDMA2000 1x EV-DO technologies. Subsequent to step S1112, if the user selects a quadruple communication mode, the CDMA module is activated or turned on and the functionality of wireless transceiving therein is enabled with two subscriber numbers for CDMA technology read from two dual-mode subscriber identity cards, respectively, while the GSM/UTRA module is activated or turned on and the functionality of wireless transceiving therein is enabled with two subscriber numbers for GSM/UTRA read from two dual-mode subscriber identity cards, respectively (step S1123). That is, the functionality of wireless transceiving enabled in the CDMA module is in compliance with any two of the IS-95, CDMA2000 1x, and CDMA2000 1x EV-DO technologies, and the functionality of wireless transceiving enabled in the GSM/UTRA module is in compliance with any two of the GSM, GPRS, EDGE, UTRA-FDD (including release 99, release 4, release 5, or release 6), and UTRA-TDD HCR or LCR (including release 99, release 4, release 5, or release 6) technologies.

Figure 12:
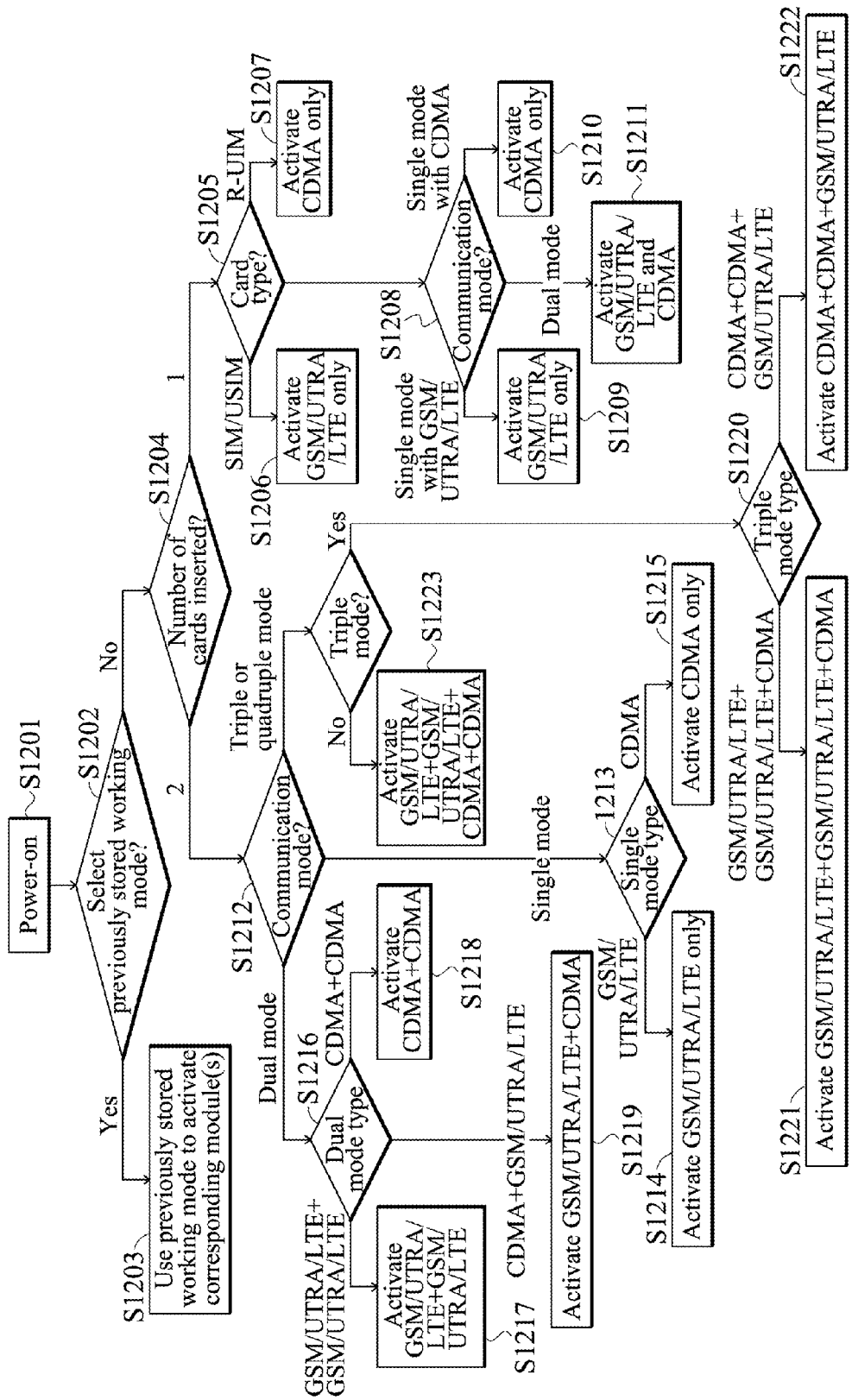
FIG. 12 is a flow chart illustrating an embodiment of the method for coordinating the operations between two communication modules with respect to the architectures shown in FIGS. 3B and 5B.

FIG. 12 is a flow chart illustrating an embodiment of the method for coordinating the operations between two communication modules with respect to the architectures shown in FIGS. 3B and 5B. In this embodiment, the method is applied in a wireless communications device which comprises two card slots, a CDMA module, and a GSM/UTRA/LTE module, wherein each of the CDMA module and the GSM/UTRA/LTE module is coupled with a respective set of an RF module and an antenna for wireless transceiving. To begin, the wireless communications device is powered on and a series of initialization processes, including booting up of the operating system, initializing of the master among the communication modules, and activating of the coupled functional modules (such as the RF module and the antenna coupled with the master), etc., are performed (step S1201). For example, the master may be the CDMA module 310 in the embodiment shown in FIG. 3B, or the master may be the GSM/UTRA/LTE module 530 in the embodiment shown in FIG. 5B. After the initialization processes are finished, the wireless communications device may prompt the user on whether to select the previously stored working mode or not (step S1202). The previously stored working mode may refer to the working mode used before the last power-off operation of the wireless communications device. If the user selects the previously stored working mode, the master among the communication modules activates the slave accordingly (step S1203). If the user does not select the previously stored working mode, the master among the communication modules detects the number of subscriber identity cards inserted in the card slots (step S1204). For the case where only 1 subscriber identity card is detected, the master then determines the type of the detected subscriber identity card (step S1205). If it is a SIM/USIM card, the GSM/UTRA/LTE module is activated or turned on and the functionality of wireless transceiving therein is enabled with the SIM/USIM card (step S1206). Specifically, if the detected subscriber identity card is a SIM card, then only the functionality of wireless transceiving in compliance with the GSM/GPRS/EDGE technology is enabled in the GSM/UTRA module. Otherwise, if the detected subscriber identity card is a USIM card, then only the functionality of wireless transceiving in compliance with the UTRA or LTE technology is enabled in the GSM/UTRA/LTE module. If the detected subscriber identity card is an R-UIM card, the CDMA module is activated or turned on and the functionality of wireless transceiving therein is enabled with the R-UIM card (step S1207). Otherwise, if it is a dual-mode subscriber identity card, the wireless communications device further prompts the user to select the communication mode (step S1208). Specifically, the dual-mode subscriber identity card comprises two subscriber numbers for CDMA and GSM/UTRA/LTE technologies, respectively. If the user selects a single communication mode with the GSM/UTRA/LTE module, the GSM/UTRA/LTE module is activated or turned on and the functionality of wireless transceiving therein is enabled with the subscriber number for GSM/UTRA/LTE read from the dual-mode subscriber identity card (step S1209). If the user selects a single communication mode with the CDMA module, the CDMA module is activated or turned on and the functionality of wireless transceiving therein is enabled with the subscriber number for CDMA technology read from the dual-mode subscriber identity card (step S1210). Otherwise, if the user selects a double communication mode, both the CDMA module and the GSM/UTRA/LTE module are activated or turned on and the functionalities of wireless transceiving therein are enabled with the two subscriber numbers read from the dual-mode subscriber identity card (step S1211).

Subsequent to step S1204, if two subscriber identity cards are detected, the master continues to prompt the user to select the communication mode (step S1212). Specifically, the user may select the communication mode according to any combination of the number and type of the detected subscriber identity cards, and the type of subscriber numbers. If the user selects a single communication mode, the master further determines whether the single communication mode is selected with the GSM/UTRA/UTRA module or the CDMA module (step S1213). If the single communication mode is selected with the GSM/UTRA/LTE module (i.e., a SIM/USIM card, or a subscriber number for GSM/UTRA/LTE in a dual-mode subscriber identity card is selected by user), the GSM/UTRA/LTE module is activated or turned on and the functionality of wireless transceiving therein is enabled with a SIM/USIM card or the subscriber number for GSM/UTRA/LTE read from a dual-mode subscriber identity card (step S1214). If the single communication mode is selected with the CDMA module (i.e., an R-UIM card, or a subscriber number for CDMA in a dual-mode subscriber identity card is selected by user), the CDMA module is activated or turned on and the functionality of wireless transceiving therein is enabled with an R-UIM card or the subscriber number for CDMA technology read from a dual-mode subscriber identity card (step S1215).

Subsequent to step S1212, if the user selects a double communication mode, the master further determines the type of the double communication mode (step S1216). If the type of the double communication mode is selected with only the GSM/UTRA/LTE module, the GSM/UTRA/LTE module is activated or turned on and the functionality of wireless transceiving therein is enabled with two SIM/USIM cards, two subscriber numbers for GSM/UTRA/LTE read from a dual-mode subscriber identity card, or one SIM/USIM card and one subscriber number for GSM/UTRA/LTE read from a dual-mode subscriber identity card, respectively (step S1217). If the type of the double communication mode is selected with only the CDMA module, the CDMA module is activated or turned on and the functionality of wireless transceiving therein is enabled with two R-UIM cards, two subscriber numbers for CDMA technology read from a dual-mode subscriber identity card, or an R-UIM card and one subscriber number for CDMA technology read from a dual-mode subscriber identity card, respectively (step S1218). Otherwise, if the type of the double communication mode is selected with both the CDMA module and the GSM/UTRA/LTE module, the CDMA module and the GSM/UTRA/LTE module are activated or turned on and the functionalities of wireless transceiving therein are enabled with an R-UIM card and a SIM/USIM card, two subscriber numbers for CDMA and GSM/UTRA/LTE read from a dual-mode subscriber identity card, one subscriber number for CDMA technology read from a dual-mode subscriber identity card and a SIM/USIM card, or an R-UIM card and one subscriber number for GSM/UTRA/LTE read from a dual-mode subscriber identity card, respectively (step S1219).

Subsequent to step S1212, if the user selects a triple communication mode, the master further determines the type of the triple communication mode (step S1220). If the type of the triple communication mode is selected with double GSM/UTRA/LTE and single CDMA, the CDMA module is activated or turned on and the functionality of wireless transceiving therein is enabled with an R-UIM card or one subscriber number for CDMA technology read from a dual-mode subscriber identity card, while the GSM/UTRA/LTE module is activated or turned on and the functionality of wireless transceiving therein is enabled with a SIM/USIM card and one subscriber number for GSM/UTRA/LTE read from a dual-mode subscriber identity card, or two subscriber numbers for GSM/UTRA/LTE read from two dual-mode subscriber identity cards, respectively (step S1221). Specifically, the functionality of wireless transceiving enabled in the GSM/UTRA/LTE module is in compliance with any two of the GSM, GPRS, EDGE, UTRA-FDD (including release 99, release 4, release 5, or release 6), UTRA-TDD HCR or LCR (including release 99, release 4, release 5, or release 6), and LTE technologies. If the type of the triple communication mode is selected with single GSM/UTRA/LTE and double CDMA, the CDMA module is activated or turned on and the functionality of wireless transceiving therein is enabled with an R-UIM card and one subscriber number for CDMA technology read from a dual-mode subscriber identity card, or two subscriber numbers for CDMA technology read from two dual-mode subscriber identity cards, respectively, while the GSM/UTRA/LTE module is activated or turned on and the functionality of wireless transceiving therein is enabled with a SIM/USIM card or one subscriber number for GSM/UTRA/LTE read from a dual-mode subscriber identity card (step S1222). Specifically, the functionality of wireless transceiving enabled in the CDMA module is in compliance with any two of the IS-95, CDMA2000 1x, and CDMA2000 1x EV-DO technologies. Subsequent to step S1212, if the user selects a quadruple communication mode, the CDMA module is activated or turned on and the functionality of wireless transceiving therein is enabled with two subscriber numbers for CDMA technology read from two dual-mode subscriber identity cards, respectively, while the GSM/UTRA/LTE module is activated or turned on and the functionality of wireless transceiving therein is enabled with two subscriber numbers for GSM/UTRA/LTE read from two dual-mode subscriber identity cards, respectively (step S1223). That is, the functionality of wireless transceiving enabled in the CDMA module is in compliance with any two of the IS-95, CDMA2000 1x, and CDMA2000 1x EV-DO technologies, and the functionality of wireless transceiving enabled in the GSM/UTRA/LTE module is in compliance with any two of the GSM, GPRS, EDGE, UTRA-FDD (including release 99, release 4, release 5, or release 6), UTRA-TDD HCR or LCR (including release 99, release 4, release 5, or release 6), and LTE technologies.

Figure 13:
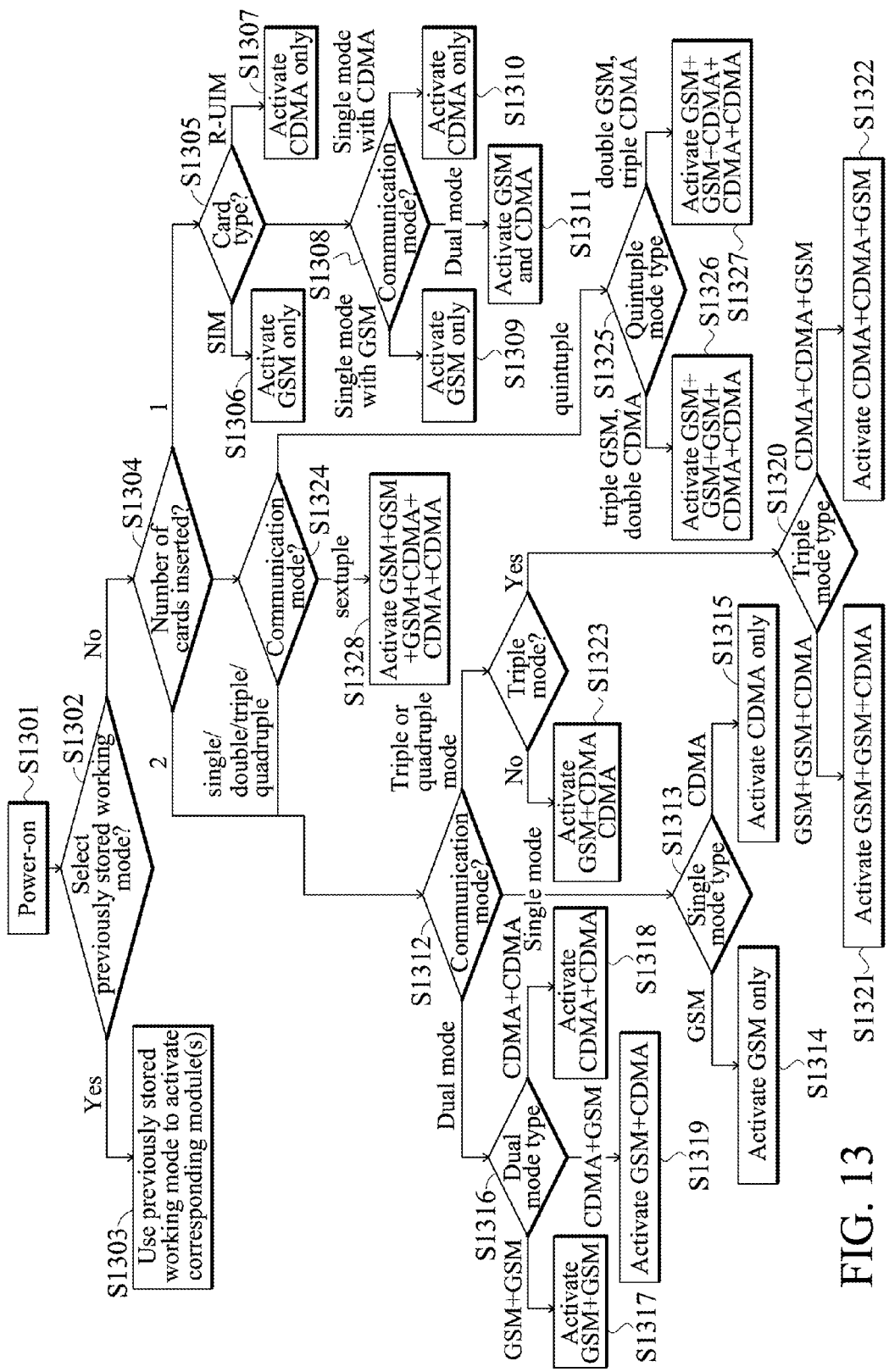
FIG. 13 is a flow chart illustrating an embodiment of the method for coordinating the operations between two communication modules with respect to the architectures shown in FIGS. 6A, 6B, 7A, and 7B.

FIG. 13 is a flow chart illustrating an embodiment of the method for coordinating the operations between two communication modules with respect to the architectures shown in FIGS. 6A, 6B, 7A, and 7B. In this embodiment, the method is applied in a wireless communications device, such as the MS 600 or the MS 700, which comprises three card slots, a CDMA module, and a GSM module, wherein each of the CDMA module and the GSM module is coupled with a respective set of an RF module and an antenna for wireless transceiving. Similar to FIG. 10, a series of initialization processes are performed after the wireless communications device is powered on, and the user may select whether to use the previously stored working mode (step S1301-S1302). If the user selects the previously stored working mode, the master among the communication modules activates the slave accordingly (step S1303). For example, the master may be the CDMA module 610 or the GSM module 620 in the embodiment shown in FIGS. 6A and 6B, or the master may be the CDMA module 710 in the embodiment shown in FIG. 7A or the master may be the GSM module 720 in the embodiment shown in FIG. 7B. If the user does not select the previously stored working mode, the master detects the number of subscriber identity cards inserted in the card slots (step S1304). For the case where only 1 subscriber identity card is detected, the master then determines the type of the detected subscriber identity card (step S1305). If it is a SIM card, the GSM module is activated or turned on and the functionality of wireless transceiving therein is enabled with the SIM card (step S1306). If it is an R-UIM card, the CDMA module is activated or turned on and the functionality of wireless transceiving therein is enabled with the R-UIM card (step S1307). Otherwise, if it is a dual-mode subscriber identity card, the wireless communications device further prompts the user to select the communication mode (step S1308). Specifically, the dual-mode subscriber identity card comprises two subscriber numbers for CDMA and GSM technologies, respectively. If the user selects a single communication mode with the GSM module, the GSM module is activated or turned on and the functionality of wireless transceiving therein is enabled with the subscriber number for GSM technology read from the dual-mode subscriber identity card (step S1309). If the user selects a single communication mode with the CDMA module, the CDMA module is activated or turned on and the functionality of wireless transceiving therein is enabled with the subscriber number for CDMA technology read from the dual-mode subscriber identity card (step S1310). Otherwise, if the user selects a double communication mode, both the CDMA module and the GSM module are activated or turned on and the functionalities of wireless transceiving therein are enabled with the two subscriber numbers read from the dual-mode subscriber identity card (step S1311).

Subsequent to step S1304, if two subscriber identity cards are detected, the master continues to prompt the user to select the communication mode (step S1312). Specifically, the user may select the communication mode according to any combination of the number and type of the detected subscriber identity cards, and the type of subscriber numbers. If the user selects a single communication mode, the master further determines whether the single communication mode is selected with the GSM module or the CDMA module (step S1313). If the single communication mode is selected with the GSM module (i.e., a SIM card, or a subscriber number for GSM in a dual-mode subscriber identity card is selected by user), the GSM module is activated or turned on and the functionality of wireless transceiving therein is enabled with a SIM card or the subscriber number for GSM technology read from a dual-mode subscriber identity card (step S1314). If the single communication mode is selected with the CDMA module (i.e., an R-UIM card, or a subscriber number for CDMA in a dual-mode subscriber identity card is selected by user), the CDMA module is activated or turned on and the functionality of wireless transceiving therein is enabled with an R-UIM card or the subscriber number for CDMA technology read from a dual-mode subscriber identity card (step S1315).

Subsequent to step S1312, if the user selects a double communication mode, the master further determines the type of the double communication mode (step S1316). If the type of the double communication mode is selected with only the GSM module, the GSM module is activated or turned on and the functionality of wireless transceiving therein is enabled with two SIM cards, two subscriber numbers for GSM technology read from a dual-mode subscriber identity card, or one SIM card and one subscriber number for GSM technology read from a dual-mode subscriber identity card, respectively (step S1317). If the type of the double communication mode is selected with only the CDMA module, the CDMA module is activated or turned on and the functionality of wireless transceiving therein is enabled with two R-UIM cards, two subscriber numbers for CDMA technology read from a dual-mode subscriber identity card, or an R-UIM card and one subscriber number for CDMA technology read from a dual-mode subscriber identity card, respectively (step S1318). Otherwise, if the type of the double communication mode is selected with both the CDMA module and the GSM module, the CDMA module and the GSM module are activated or turned on and the functionalities of wireless transceiving therein are enabled with an R-UIM card and a SIM card, two subscriber numbers for CDMA and GSM read from a dual-mode subscriber identity card, one subscriber number for CDMA technology read from a dual-mode subscriber identity card and a SIM card, or an R-UIM card and one subscriber number for GSM technology read from a dual-mode subscriber identity card, respectively (step S1319).

Subsequent to step S1312, if the user selects a triple communication mode, the master further determines the type of the triple communication mode (step S1320). If the type of the triple communication mode is selected with double GSM and single CDMA, the CDMA module is activated or turned on and the functionality of wireless transceiving therein is enabled with an R-UIM card or one subscriber number for CDMA technology read from a dual-mode subscriber identity card, while the GSM module is activated or turned on and the functionality of wireless transceiving therein is enabled with a SIM card and one subscriber number for GSM technology read from a dual-mode subscriber identity card, or two subscriber numbers for GSM technology read from two dual-mode subscriber identity cards, respectively (step S1321). If the type of the triple communication mode is selected with single GSM and double CDMA, the CDMA module is activated or turned on and the functionality of wireless transceiving therein is enabled with an R-UIM card and one subscriber number for CDMA technology read from a dual-mode subscriber identity card, or two subscriber numbers for CDMA technology read from two dual-mode subscriber identity cards, respectively, while the GSM module is activated or turned on and the functionality of wireless transceiving therein is enabled with a SIM card or one subscriber number for GSM technology read from a dual-mode subscriber identity card (step S1322). Subsequent to step S1312, if the user selects a quadruple communication mode, the CDMA module is activated or turned on and the functionality of wireless transceiving therein is enabled with two subscriber numbers for CDMA technology read from two dual-mode subscriber identity cards, respectively, while the GSM module is activated or turned on and the functionality of wireless transceiving therein is enabled with two subscriber numbers for GSM technology read from two dual-mode subscriber identity cards, respectively (step S1323).

Subsequent to step S1304, if three subscriber identity cards are detected, the master continues to prompt the user to select the communication mode (step S1324). Specifically, the user may select the communication mode according to any combination of the number and type of the detected subscriber identity cards, and the type of subscriber numbers. If the user selects a single communication mode, the flow of the method proceeds to step S1313. If the user selects a double communication mode, the flow of the method proceeds to step S1316. If the user selects a triple communication mode, the flow of the method proceeds to step S1320. If the user selects a quadruple communication mode, the flow of the method proceeds to step S1323.

Note that, in this embodiment, the wireless communications device supports 5 and 6 standby mode, in addition to the 1 to 4 standby modes described above. Subsequent to step S1324, if the user selects a quintuple communication mode, the master further determines the type of the quintuple communication mode (step S1325). If the type of the quintuple communication mode is selected with triple GSM and double CDMA, the CDMA module is activated or turned on and the functionality of wireless transceiving therein is enabled with two subscriber numbers for CDMA technology read from two dual-mode subscriber identity cards, respectively, while the GSM module is activated or turned on and the functionality of wireless transceiving therein is enabled with three subscriber numbers for GSM technology read from the three dual-mode subscriber identity cards, or a SIM card and two subscriber numbers for GSM technology read from two dual-mode subscriber identity cards, respectively (step S1326). If the type of the quintuple communication mode is selected with double GSM and triple CDMA, the CDMA module is activated or turned on and the functionality of wireless transceiving therein is enabled with an R-UIM card and two subscriber numbers for CDMA technology read from two dual-mode subscriber identity cards, or three subscriber numbers for CDMA technology read from the three dual-mode subscriber identity cards, respectively, while the GSM module is activated or turned on and the functionality of wireless transceiving therein is enabled with two subscriber numbers for GSM technology read from two dual-mode subscriber identity cards, respectively (step S1327). Subsequent to step S1324, if the user selects a sextuple communication mode, the CDMA module is activated or turned on and the functionality of wireless transceiving therein is enabled with three subscriber numbers for CDMA technology read from the three dual-mode subscriber identity cards, respectively, while the GSM module is activated or turned on and the functionality of wireless transceiving therein is enabled with three subscriber numbers for GSM technology read from the three dual-mode subscriber identity cards, respectively (step S1328).

Note that, the CDMA module and the GSM module may be integrated into a single combo communication module, such as the CDMA+GSM combo module 810, which supports both the CDMA and GSM technologies, so the method as described in FIG. 13 may also be applied for such a combo-communication-module design, and the invention is not limited thereto. In addition, for those skilled in the art, modifications may be contemplated to apply the method for coordinating the operations between two communication modules as described above in FIGS. 10 to 13 in the architecture as shown in FIG. 9.

While the invention has been described by way of example and in terms of preferred embodiment, it is to be understood that the invention is not limited thereto. Those who are skilled in this technology can still make various alterations and modifications without departing from the scope and spirit of this invention. For example, the CDMA module, the GSM module, the GSM/UTRA module, or the GSM/UTRA/LTE module may be replaced with a communication module operating in compliance with a different wireless communication technology, such as the TD-SCDMA technology, the WiMAX technology, or others. Although the MS architectures in the embodiments described above comprise two or three card slots, the invention is not limited thereto. The embodiments may also be applied to other MS architectures with four or more card slots as long as the applied MS supports a septuple standby mode or more. Therefore, the scope of the present invention shall be defined and protected by the following claims and their equivalents.

What is claimed is:

1. A wireless communications device, comprising:
a plurality of card slots, inserted with at least one subscriber identity card comprising a dual mode subscriber identity card which contains two subscriber numbers;
a first wireless communications module performing wireless transceiving in compliance with at least a first wireless technology; and
a second wireless communications module configured in a master-slave relationship with the first wireless communications module, the second wireless communications module being directly coupled to the plurality of card slots and determining at least a first subscriber number and a second subscriber number from the plurality of card slots, the second wireless communications module providing the first subscriber number to the first wireless communications module, the second wireless communications module enabling the wireless transceiving of the first wireless communications module using the first subscriber number, and the second wireless communications module performing wireless transceiving in compliance with at least a second wireless technology using the second subscriber number.

2. The wireless communications device of claim 1, wherein the second wireless communications module further determines a total number of the at least one subscriber identity card, and determines a card type for each one of the at least one subscriber identity card.

3. The wireless communications device of claim 2, wherein the wireless transceiving of the first wireless communications module and the second wireless communications module is enabled and performed, respectively, according to the total number and the card type of the at least one subscriber identity card.

4. The wireless communications device of claim 1, wherein the first wireless communications module and the second wireless communications module operate in a standby mode in response to the determining of the first subscriber number and the second subscriber number.

5. The wireless communications device of claim 1, wherein the second wireless communications module further determines whether a predetermined communication mode is applicable, and the wireless transceiving of the first wireless communications module and the second wireless communications module is enabled and performed, respectively, according to the predetermined communication mode.

6. The wireless communications device of claim 1, wherein the at least one subscriber identity card further comprises
one or more single-mode subscriber identity cards.

7. The wireless communications device of claim 1, wherein the first wireless technology and the second wireless technology comprise any combination of the following:
a Global System for Mobile communications (GSM) technology;
a General Packet Radio Service (GPRS) technology;
an Enhanced Data rates for Global Evolution (EDGE) technology;
a Universal Mobile Telecommunications System (UMTS) Terrestrial Radio Access (UTRA) technology;
a High Speed xlink Packet Access (HSxPA) technology;
a Long Term Evolution (LTE) technology;
an LTE-Advanced technology;
a Time Division-Synchronous Code Division Multiple Access (TD-SCDMA) technology;
a TD-LTE technology;
a TD-LTE-Advanced technology;
an Interim Standard 95 (IS-95) technology;
a Code Division Multiple Access 2000 (CDMA2000) 1x technology;
a CDMA2000 1x Evolution-Data Optimized or Evolution-Data (CDMA2000 1x EV-DO) technology; and
a Worldwide Interoperability for Microwave Access (WiMAX) technology.

8. The wireless communications device of claim 1, wherein the two subscriber numbers contained in the dual mode subscriber identity card are the first subscriber identity number for the first wireless technology and the second subscriber identity number for the second wireless technology.

9. The wireless communications device of claim 1, wherein the at least one subscriber identity card further comprises one single mode subscriber identity card which contains one of the first subscriber identity number for the first wireless technology and the second subscriber identity number for the second wireless technology, and one of the two subscriber numbers contained in the dual mode subscriber identity card is another one of the first subscriber identity number for the first wireless technology and the second subscriber identity number for the second wireless technology.

10. A method for coordinating operations of multiple wireless communications modules in a wireless communications device with multiple subscriber numbers, comprising:
providing a first wireless communications module and a second wireless communications module in a master-slave configuration, with the second wireless communications module being configured as the master, in compliance with at least a first wireless technology and at least a second wireless technology, respectively;
detecting, by the second wireless communications module, at least one subscriber identity card inserted into a plurality of card slots directly coupled to the second wireless communications module, wherein the at least one subscriber identity card comprises a dual mode subscriber identity card which contains two subscriber numbers;
determining, by the second wireless communications module, at least a first subscriber number and a second subscriber number from the plurality of card slots;
providing, by the second wireless communications module, the first subscriber number to the first wireless communications module;
enabling, by the second wireless communications module, the first wireless communications module for wireless transceiving using the first subscriber number, and performing, by the second wireless communications module, wireless transceiving using the second subscriber number, respectively.

11. The method of claim 10, further comprising determining a total number of the at least one subscriber identity card, and determining a card type for each one of the at least one subscriber identity card.

12. The method of claim 11, wherein the wireless transceiving of the first wireless communications module and the second wireless communications module is enabled according to the total number and the card type of the at least one subscriber identity card.

13. The method of claim 10, wherein the first wireless communications module and the second wireless communications module operate in a standby mode after being enabled.

14. The method of claim 10, further comprising determining whether a predetermined communication mode is applicable, wherein the wireless transceiving of the first wireless communications module and the second wireless communications module is enabled according to the predetermined communication mode.

15. The method of claim 10, wherein the at least one subscriber identity card further comprises
one or more single-mode subscriber identity cards.

16. The method of claim 10, wherein the first wireless technology and the second wireless technology comprise any combination of the following:
a Global System for Mobile communications (GSM) technology;
a General Packet Radio Service (GPRS) technology;
an Enhanced Data rates for Global Evolution (EDGE) technology;
a Universal Mobile Telecommunications System (UMTS) Terrestrial Radio Access (UTRA) technology;
a High Speed xlink Packet Access (HSxPA) technology;
a Long Term Evolution (LTE) technology;
an LTE-Advanced technology;
a Time Division-Synchronous Code Division Multiple Access (TD-SCDMA) technology;
a TD-LTE technology;
a TD-LTE-Advanced technology;
an Interim Standard 95 (IS-95) technology;
a Code Division Multiple Access 2000 (CDMA2000) 1x technology;
a CDMA2000 1x Evolution-Data Optimized or Evolution-Data (CDMA2000 1x EV-DO) technology; and
a Worldwide Interoperability for Microwave Access (WiMAX) technology.

17. The method of claim 10, wherein the two subscriber numbers contained in the dual mode subscriber identity card are the first subscriber identity number for the first wireless technology and the second subscriber identity number for the second wireless technology.

18. The method of claim 10, wherein the at least one subscriber identity card further comprises one single mode subscriber identity card which contains one of the first subscriber identity number for the first wireless technology and the second subscriber identity number for the second wireless technology, and one of the two subscriber numbers contained in the dual mode subscriber identity card is another one of the first subscriber identity number for the first wireless technology and the second subscriber identity number for the second wireless technology.

* * * * *